United States Patent
Hoshiyama et al.

(10) Patent No.: US 7,901,020 B2
(45) Date of Patent: Mar. 8, 2011

(54) PRINTING APPARATUS AND PRINTING METHOD

(75) Inventors: Yoshiko Hoshiyama, Shiojiri (JP); Hirokazu Nunokawa, Shiojiri (JP); Akito Sato, Siojiri (JP)

(73) Assignee: Seiko Epson Corporation, Tokyo (JP)

( * ) Notice: Subject to any disclaimer, the term of this patent is extended or adjusted under 35 U.S.C. 154(b) by 1080 days.

(21) Appl. No.: 11/656,473

(22) Filed: Jan. 23, 2007

(65) Prior Publication Data
US 2007/0182974 A1 Aug. 9, 2007

(30) Foreign Application Priority Data

Jan. 23, 2006 (JP) ................................. 2006-014343

(51) Int. Cl.
*B41J 29/38* (2006.01)
(52) U.S. Cl. .................. 347/10; 347/9; 347/11
(58) Field of Classification Search .................. 347/5, 9, 347/10, 11, 12, 19
See application file for complete search history.

(56) References Cited

U.S. PATENT DOCUMENTS

| 6,494,556 | B1 * | 12/2002 | Sayama et al. | 347/11 |
| 2003/0016257 | A1 * | 1/2003 | Asauchi et al. | 347/10 |

FOREIGN PATENT DOCUMENTS

JP 10-193587 A 7/1998

* cited by examiner

*Primary Examiner* — Lam S Nguyen
(74) *Attorney, Agent, or Firm* — Sughrue Mion, PLLC

(57) ABSTRACT

In printing of multi-level darkness/lightness of a certain color, which is performed with a dark ink and a light ink of the certain color, graininess is improved. A printing method includes generating a plurality of types of drive signals, and ejecting the dark ink and the light ink from a head, an amount of each ink varying for each dot tone value. In generation of a plurality of the types of the drive signals, a plurality of the types of drive signals are generated, where a waveform section that is for the dark ink of the certain color and that corresponds to a minimum dot tone value in ejection of ink is different from a waveform section that is for the light ink of the certain color and that corresponds to the minimum dot tone value, and where a waveform section that is for the dark ink of the certain color and that corresponds to a maximum dot tone value is different from a waveform section that is for the light ink of the certain color and that corresponds to the maximum dot tone value. In ejection of the dark ink and the light ink from the head, a drive signal that is generated based on a type of the dot tone value designated according to a size of a to-be-formed dot and based on a type of the ink is applied to an element that is provided on the head and that performs an operation for ejecting ink.

9 Claims, 17 Drawing Sheets

| INK \ TONE LEVEL | APPLIED DRIVE PULSE (SPECIFIED BY TONE VALUE) | | | |
|---|---|---|---|---|
| | NO DOT (00) | SMALL DOT (01) | MEDIUM DOT (10) | LARGE DOT (11) |
| LIGHT CYAN INK | — | 2ND | 3RD | 1ST , 3RD |
| DARK CYAN INK | — | 3RD | 1ST , 3RD | 1ST , 3RD , 4TH |
| LIGHT MAGENTA INK | — | 2ND | 3RD | 1ST , 3RD |
| DARK MAGENTA INK | — | 3RD | 1ST , 3RD | 1ST , 3RD , 4TH |
| YELLOW INK | — | 3RD | 1ST , 3RD | 1ST , 3RD , 4TH |
| BLACK INK | — | 3RD | 1ST , 3RD | 1ST , 3RD , 4TH |

| | LIGHT CYAN INK | | | DARK CYAN INK | | |
|---|---|---|---|---|---|---|
| | SMALL DOT (01) | MEDIUM DOT (10) | LARGE DOT (11) | SMALL DOT (01) | MEDIUM DOT (10) | LARGE DOT (11) |
| EJECTED AMOUNT | 2.5pL | 7.0pL | 14.0pL | 7.0pL | 14.0pL | 21.0pL |
| EQUIVALENT DARK-INK AMOUNT | 0.8pL | 2.3pL | 4.7pL | 7.0pL | 14.0pL | 21.0pL |
| DIFFERENCE IN INK AMOUNT | 1.5pL | 2.4pL | 2.3pL | 7.0pL | 7.0pL | |

| INK \ TONE LEVEL | APPLIED DRIVE PULSE (SPECIFIED BY TONE VALUE) | | | |
|---|---|---|---|---|
| | NO DOT (00) | SMALL DOT (01) | MEDIUM DOT (10) | LARGE DOT (11) |
| LIGHT CYAN INK | — | 2ND | 3RD | 1ST, 3RD |
| DARK CYAN INK | — | 3RD | 1ST, 3RD | 1ST, 3RD, 4TH |
| LIGHT MAGENTA INK | — | 2ND | 3RD | 1ST, 3RD |
| DARK MAGENTA INK | — | 3RD | 1ST, 3RD | 1ST, 3RD, 4TH |
| YELLOW INK | — | 3RD | 1ST, 3RD | 1ST, 3RD, 4TH |
| BLACK INK | — | 3RD | 1ST, 3RD | 1ST, 3RD, 4TH |

FIG. 12

|  | LIGHT CYAN INK ||| DARK CYAN INK |||
| --- | --- | --- | --- | --- | --- | --- |
|  | SMALL DOT (01) | MEDIUM DOT (10) | LARGE DOT (11) | SMALL DOT (01) | MEDIUM DOT (10) | LARGE DOT (11) |
| EJECTED AMOUNT | 2.5pL | 7.0pL | 14.0pL | 7.0pL | 14.0pL | 21.0pL |
| EQUIVALENT DARK-INK AMOUNT | 0.8pL | 2.3pL | 4.7pL | 7.0pL | 14.0pL | 21.0pL |
| DIFFERENCE IN INK AMOUNT | 1.5pL | 2.4pL | 2.3pL | 7.0pL | 7.0pL | 7.0pL |

FIG. 13

| INK \ TONE LEVEL | APPLIED DRIVE PULSE (SPECIFIED BY TONE VALUE) | | | |
|---|---|---|---|---|
| | NO DOT (00) | SMALL DOT (01) | MEDIUM DOT (10) | LARGE DOT (11) |
| LIGHT CYAN INK | — | 4TH | 2ND | 3RD |
| DARK CYAN INK | — | 3RD | 1ST, 3RD | 1ST, 3RD, 5TH |
| LIGHT MAGENTA INK | — | 4TH | 2ND | 3RD |
| DARK MAGENTA INK | — | 3RD | 1ST, 3RD | 1ST, 3RD, 5TH |
| YELLOW INK | — | 3RD | 1ST, 3RD | 1ST, 3RD, 5TH |
| BLACK INK | — | 3RD | 1ST, 3RD | 1ST, 3RD, 5TH |

FIG. 17

|  | LIGHT CYAN INK ||| DARK CYAN INK |||
| --- | --- | --- | --- | --- | --- | --- |
|  | SMALL DOT (01) | MEDIUM DOT (10) | LARGE DOT (11) | SMALL DOT (01) | MEDIUM DOT (10) | LARGE DOT (11) |
| EJECTED AMOUNT | 1.6pL | 3.5pL | 7.0pL | 7.0pL | 14.0pL | 21.0pL |
| EQUIVALENT DARK-INK AMOUNT | 0.5pL | 1.2pL | 2.3pL | 7.0pL | 14.0pL | 21.0pL |
| DIFFERENCE IN INK AMOUNT | 0.7pL | 1.1pL | 4.7pL | 7.0pL | 7.0pL | 7.0pL |

FIG. 18

PRINTING APPARATUS AND PRINTING METHOD

CROSS-REFERENCE TO RELATED APPLICATIONS

The present application claims priority from Japanese Patent Application No. 2006-14343 filed on Jan. 23, 2006, which is herein incorporated by reference.

BACKGROUND

1. Technical Field

The present invention relates to printing apparatuses and printing methods.

2. Related Art

As a so-called inkjet printing apparatus, which performs printing by ejecting ink from a head, there are a printer, a plotter, or a facsimile, for example. Among printing apparatuses of this kind, there are printing apparatuses that control operations of elements provided in a head by drive signals and that eject ink; wherein an amount of the ink is different depending on a dot tone level that is based on a size of a to-be-formed dot (see JP-A-10-193587, for example). The above-mentioned apparatuses perform such control using four dot tone levels that consist of non-formation of a dot, a small dot, a medium dot, and a large dot. Therefore, four types of drive signals generated for each dot tone level are applied to the elements selectively.

Among the above-mentioned printing apparatuses, there are printing apparatuses that perform printing of multi-level darkness/lightness of a certain color with a dark ink and a light ink of the color. In such printing apparatuses, a common drive signal is used regardless of type of ink. In this case, if a drive signal is set to a same drive signal for each tone level and the dark ink and the light ink of the certain color are ejected, there are cases in which graininess deteriorates. It is considered that this is caused by the fact that ejected amounts of the dark ink and the light ink become the same for each tone level.

SUMMARY

The present invention has been made in view of the above and other issues. A primary aspect of the invention is to improve graininess in printing of multi-level darkness/lightness of a certain color, the printing being performed with a dark ink and a light ink of the color.

A primary aspect of the invention is the following printing method.

A printing method, including:

generating a plurality of types of drive signals, where a waveform section that is for a dark ink of a certain color and that corresponds to a minimum dot tone value in ejection of ink is different from a waveform section that is for a light ink of the certain color and that corresponds to the minimum dot tone value, and where a waveform section that is for the dark ink of the certain color and that corresponds to a maximum dot tone value is different from a waveform section that is for the light ink of the certain color and that corresponds to the maximum dot tone value; and ejecting the dark ink and the light ink from a head by applying a drive signal that is generated based on a dot tone value designated according to a size of a to-be-formed dot and based on a type of the inks, to an element that is provided on the head and that performs an operation for ejecting the inks, an amount of each ink being determined for each dot tone value.

Other features of the invention will become clear by the accompanying drawings and the description herebelow.

BRIEF DESCRIPTION OF THE DRAWINGS

For a more complete understanding of the invention and the advantages thereof, reference is now made to the following description taken in conjunction with the accompanying drawings.

FIG. 12 is a table showing drive pulses applied to a piezo element, for each type of inks and each tone level.

FIG. 13 is a table showing, for each type of dot formation data, ejected amounts of the light cyan ink and the dark cyan ink, and equivalent amounts of the light cyan ink to the dark cyan ink.

FIG. 17 is a table showing drive pulses applied to a piezo element, for each type of inks and each tone level.

FIG. 18 is a table showing, for each type of dot formation data, ejected amounts of the light cyan ink and the dark cyan ink, and equivalent amounts of the light cyan ink to the dark cyan ink.

DESCRIPTION OF EXEMPLARY EMBODIMENTS

Figure 1:
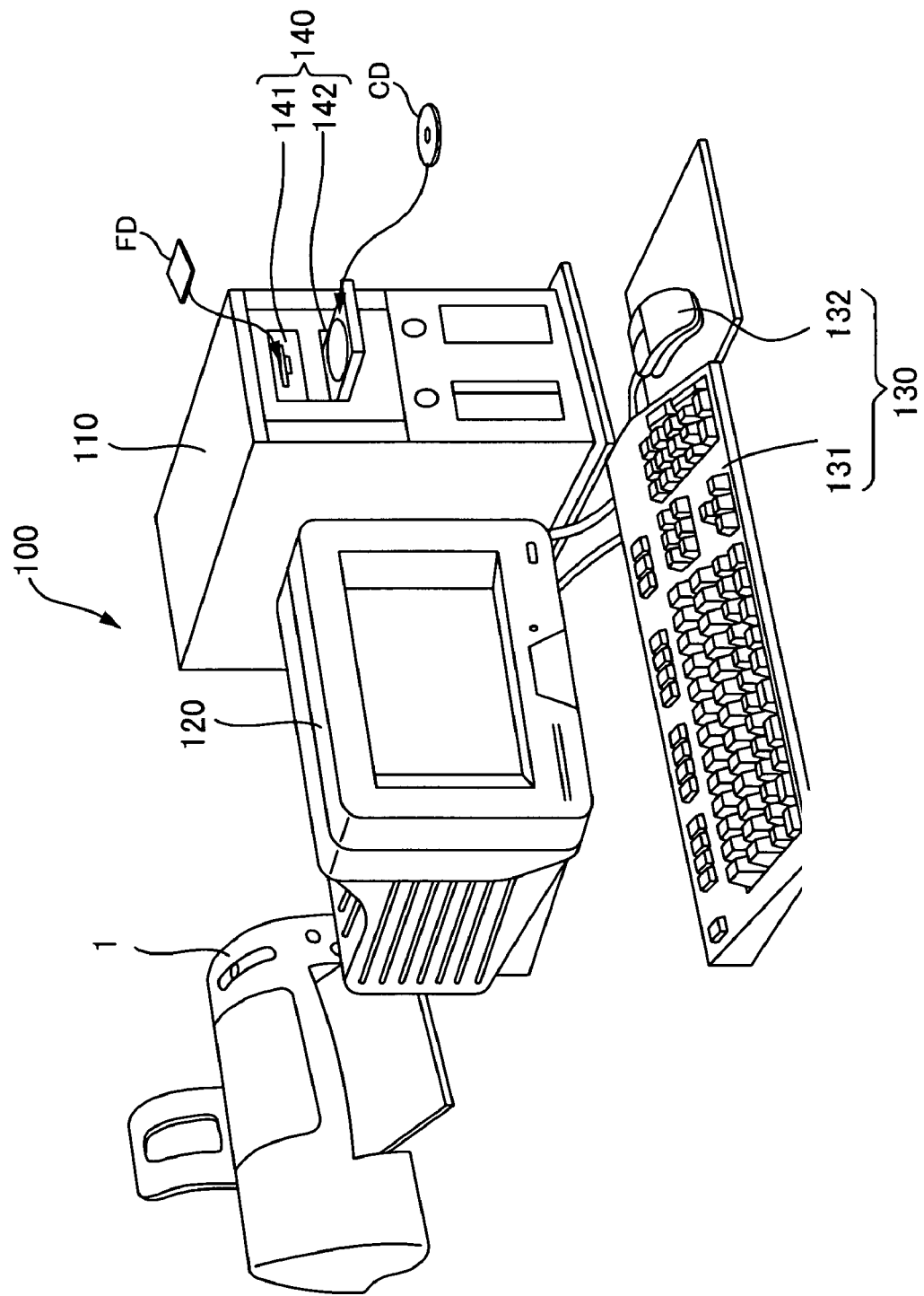
FIG. 1 is an explanatory diagram showing the configuration of printing system.

At least the following matters will be made clear by the specification and the accompanying drawings.

A printing method, including:

generating a plurality of types of drive signals, where a waveform section that is for a dark ink of a certain color and that corresponds to a minimum dot tone value in ejection of ink is different from a waveform section that is for a light ink of the certain color and that corresponds to the minimum dot tone value, and where a waveform section that is for the dark ink of the certain color and that corresponds to a maximum dot tone value is different from a waveform section that is for the light ink of the certain color and that corresponds to the maximum dot tone value; and ejecting the dark ink and the light ink from a head by applying a drive signal that is generated based on a dot tone value designated according to a size of a to-be-formed dot and based on a type of the inks, to an element that is provided on the head and that performs an operation for ejecting the inks, an amount of each ink being determined for each dot tone value.

With this printing method, it is possible to determine a dark-ink ejected amount and a light-ink ejected amount that both correspond to the minimum dot tone value. Also, it is possible to determine a dark-ink ejected amount and a light-ink ejected amount that both correspond to the maximum dot tone value. This enables to optimize a density range printed with the dark ink and a density range printed with the light ink, and enables to make a degree of density transition in a print image smoother. As a result thereof, graininess can be improved.

In this printing method, it is preferable that, in generating a plurality of the types of the drive signals, an original drive signal that has a plurality of the waveform sections is generated, and an operation of a switch that applies to the element and interrupts the original drive signal is controlled according to the dot tone value designated according to the size of the to-be-formed dot and the type of the ink.

With this printing method, it is possible to easily generate a plurality of the types of the drive signals from the common original drive signal by controlling the switch.

In this printing method, it is preferable that, in generating a plurality of the types of the drive signals, switch-operation information that is stored in a switch-operation information storing section for each type of the dot tone values and that is for determining the operation of the switch depending on a type of a to-be-ejected ink is selected base on the designated dot tone value, and the operation of the switch is controlled by using the selected switch-operation information.

With this printing method, it is possible to perform controls easily.

In this printing method, in generating a plurality of the types of the drive signals, a plurality of the types of the drive signals are generated, where a waveform section that is for the dark ink and that corresponds to a certain dot tone value is the same as a waveform section that is for the light ink and that corresponds to another dot tone value.

With this printing method, a certain waveform section that the drive signal has is used for dark-ink ejection corresponding to the certain dot tone value and for light-ink ejection corresponding to the other dot tone value. Accordingly, it is possible to make the degree of density transition in a print image smoother while reducing types of the waveform sections.

In this printing method, in generating a plurality of the types of the drive signals, a plurality of types of the drive signals are generated, where a waveform section that is for the dark ink and that corresponds to the minimum dot tone value is the same as a waveform section that is for the light ink and that corresponds to the maximum dot tone value.

With this printing method, a certain waveform section that the drive signal has is used for dark-ink ejection corresponding to the minimum dot tone value and for light-ink ejection corresponding to the maximum dot tone value. Accordingly, it is possible to further make the degree of density transition in a print image smoother while reducing the types of the waveform sections.

In this printing method, in generating a plurality of the types of the drive signals, a plurality of types of the drive signals are generated; the drive signals including a drive signal whose waveform section that is for-light-ink and that corresponds to the maximum dot tone value is determined and a drive signal whose waveform section that is for the dark ink and that corresponds to the minimum dot tone value is determined, wherein an amount converted to the dark ink of a light ink that is ejected for the maximum dot tone value is smaller than an amount of a dark ink that is ejected for the minimum dot tone value.

With this printing method, it is possible to optimize the density range printed with the dark ink and the density range printed with the light ink. Accordingly, fine tone representation can be achieved.

In this printing method, in ejection of the dark ink and the light ink from the head, a dark ink and a light ink that are used in printing of multi-level darkness/lightness of cyan are ejected, the amount of each ink varying for each of the dot tone values.

With this printing method, it is possible to improve graininess for cyan, which greatly affects hues.

In this printing method, in ejection of the dark ink and the light ink from the head, a dark ink and a light ink that are used in printing of multi-level darkness/lightness of magenta are ejected, the amount of each ink varying for each of the dot tone values.

With this printing method, it is possible to improve graininess for magenta, which greatly affects hues.

In this printing method, in generating a plurality of the types of the drive signals, a type of an ink ejected by the head is recognized based on ink-type information that is stored in a container-side storage section provided in an ink storage container that stores a plurality of the types of the ink, and that indicates a type of the ink stored in the ink storage container.

With this printing method, it is possible to recognize the type of the ink depending on an ink storage container that is used, so that operations can be facilitated.

Also, it will be made clear that the following printing apparatus can be achieved.

A printing apparatus, including:

a head that includes an element that operates for ejecting an ink, and that ejects a dark ink and a light ink that are used in printing of multi-level darkness/lightness of a certain color, an amount of the ink being determined for each dot tone value that is based on a size of a to-be-formed dot; and a drive-signal generating section that generates a drive signal whose waveform section is for operating the element, and that generates a plurality of types of the drive signals, where a waveform section that is for the dark ink and that corresponds to a minimum dot tone value in ejection of ink is different from a waveform section that is for the light ink and that corresponds to the minimum dot tone value, and where a waveform section that is for the dark ink and that corresponds to a maximum dot tone value is different from a waveform section that is for the light ink and that corresponds to the maximum dot tone value.

First Embodiment

Configuration of Printing System 100

First, a printing apparatus is described with a printing system 100. Here, FIG. 1 is an explanatory diagram showing the configuration of the printing system 100. The illustrated printing system 100 has a printer 1 as the printing apparatus and a computer 110 as a printing control apparatus. Specifically, the printing system 100 has the printer 1, the computer 110, a display device 120, an input device 130, and a record/play device 140. The printer 1 prints an image on a medium, such as paper, cloth, film and the like. This section below describes an example of a sheet of paper S, which is a typical medium (see FIG. 3A). The computer 110 is communicably connected to the printer 1. In order to make the printer 1 print an image, the computer 110 outputs print data corresponding to that image to the printer 1. This computer 110 has computer programs, such as an application program and a printer driver, installed thereon. The display device 120 has a display. This display device 120 is for displaying a user interface of the computer program, for example. The input device 130 is, for example, a keyboard 131 and a mouse 132. The record/play device 140 is, for example, a flexible disk drive device 141 and a compact disk drive device 142.

Computer 110

Regarding Configuration of Computer 110

Figure 2:
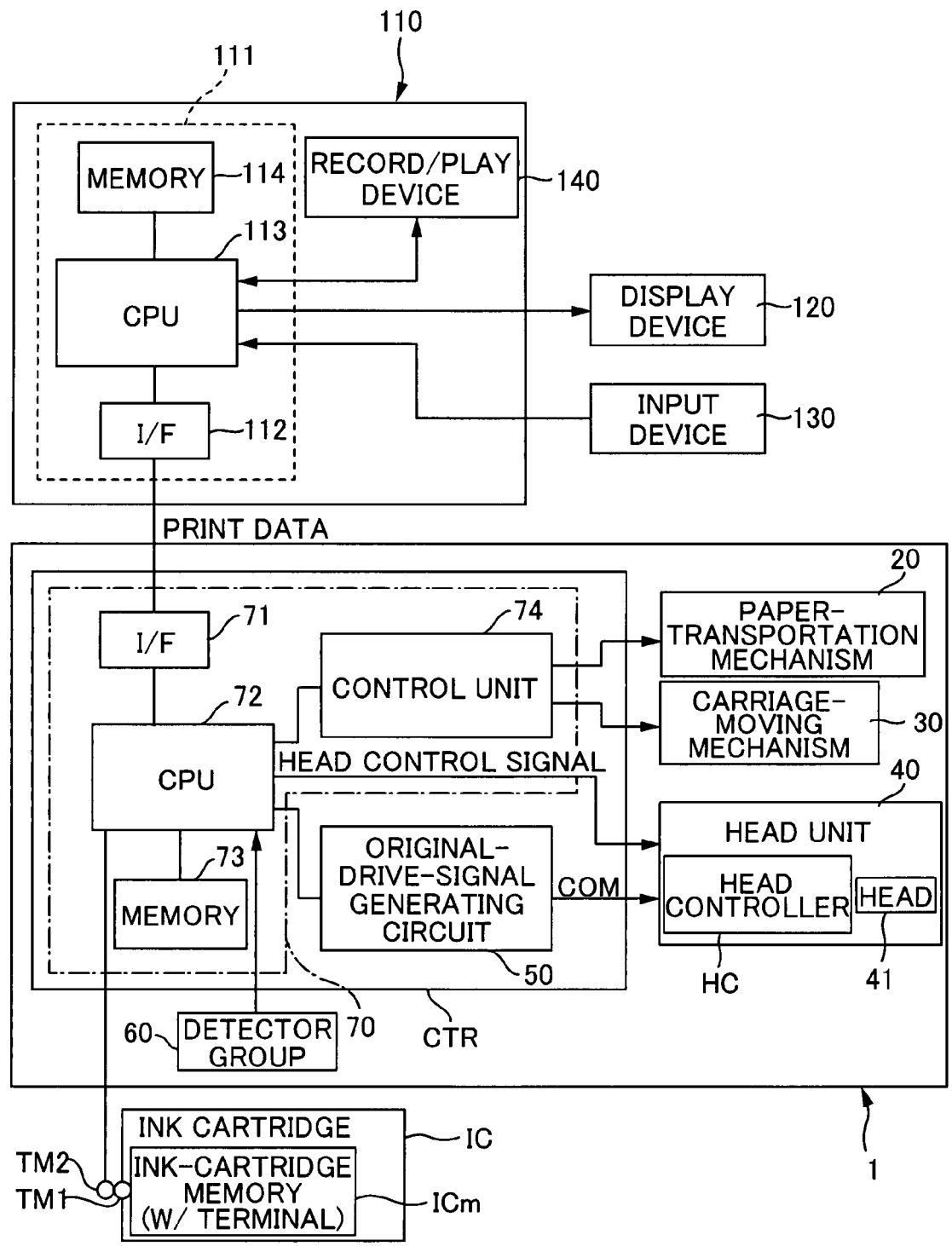
FIG. 2 is a block diagram showing the configuration of a computer and a printer.

FIG. 2 is a block diagram showing the configuration of the computer 110 and the printer 1. First, the configuration of the computer 110 is described briefly. This computer 110 has the above-mentioned record/play device 140 and a host-side controller 111. The record/play device 140 is connected communicably to the host-side controller 111 and is attached to an enclosure of the computer 110, for example. The host-side controller 111 performs various controls on the computer 110, and the display device 120 and the input device 130 mentioned above are connected communicably to the host-side controller 111. This host-side controller 111 has an interface section 112, a CPU 113, and a memory 114. The interface section 112 is provided between the computer 110 and the printer 1 and exchanges data therebetween. The CPU 113 is a processing unit for carrying out overall control of the computer 110. The memory 114 is for reserving a work area and a storage area for the computer programs for the CPU 113, and is composed of a RAM, an EEPROM, a ROM, a magnetic disk device and the like. As mentioned above, the computer program stored in this memory 114 is an application program, a printer driver or the like. These application program and printer driver are provided via a flexible disk FD and a compact disk CD, for example. The CPU 113 performs various controls according to the computer program stored in the memory 114.

Figure 6:
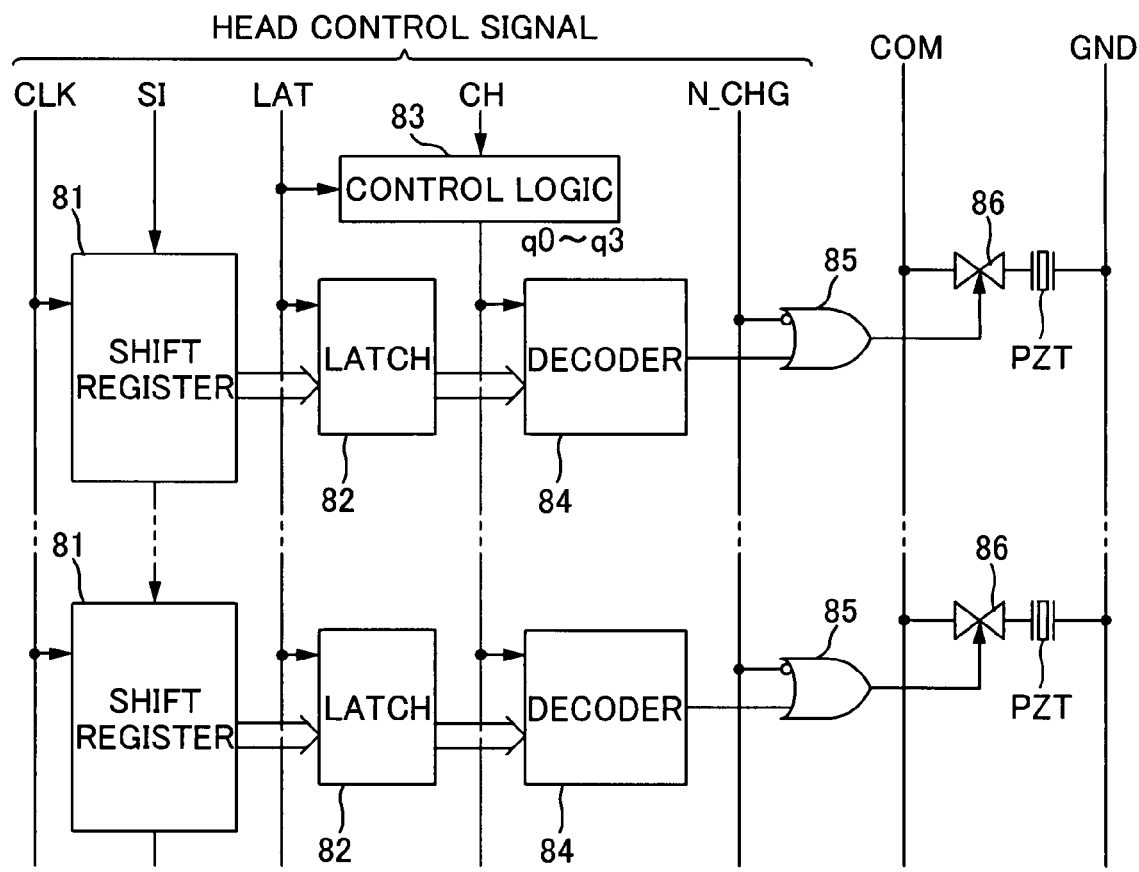
FIG. 6 is a block diagram for illustrating the configuration of a head controller.

The print data is data in a form that can be interpreted by the printer 1, and includes various command data and dot formation data SI (see FIG. 6). The command data is data for instructing the printer 1 to execute a specific operation. Among the command data are, for example, command data for instructing to supply paper, command data for indicating a transporting amount, and command data for instructing to discharge paper. The dot formation data SI is data relating to a dot of a to-be-printed image. Here, the dot is formed corresponding to a virtual square region defined on the paper sheet S (also referred to as a "unit region"). The dot formation data SI is equivalent to a dot tone value that is based on the size of a to-be-formed dot. In the present embodiment, the dot formation data SI (the dot tone value) consists of 2-bit data. Accordingly, among the dot formation data SI, there are data "00" corresponding to no dot (no ejection of ink), data "01" corresponding to formation of a small dot, data "10" corresponding to formation of a medium dot, and data "11" corresponding to formation of a large dot. In short, in the printer 1, selection from the four types of the dot tone values can be performed for one unit region.

Printer 1

Regarding Configuration of Printer 1

Figure 3A:
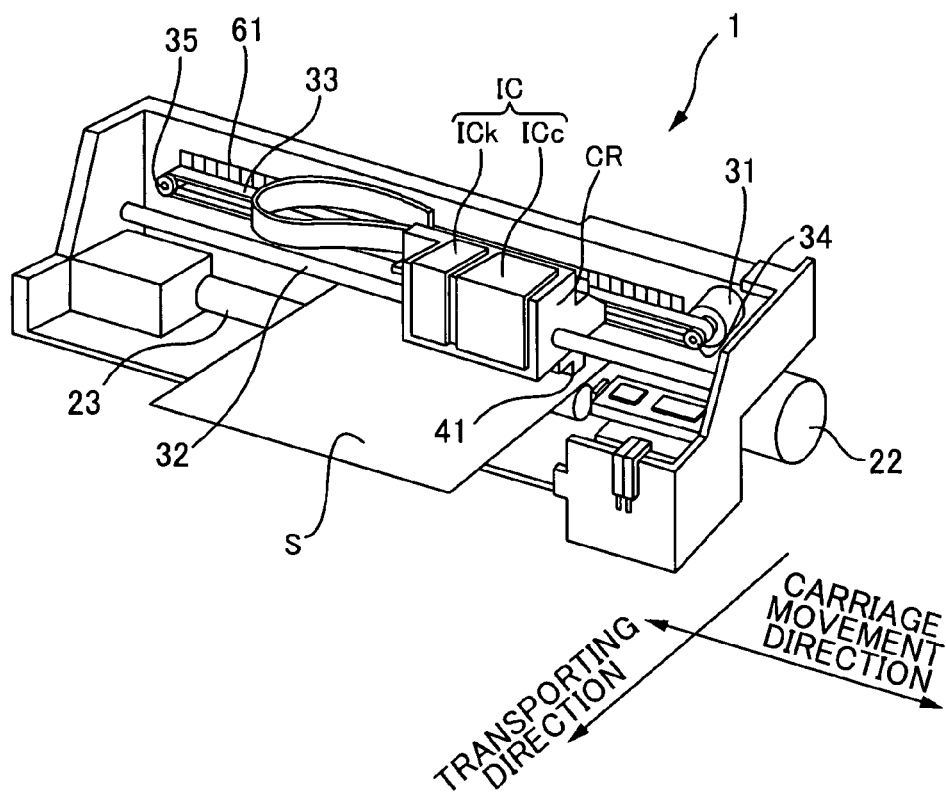
FIG. 3A is a diagram showing the structure of the printer.
Figure 3B:
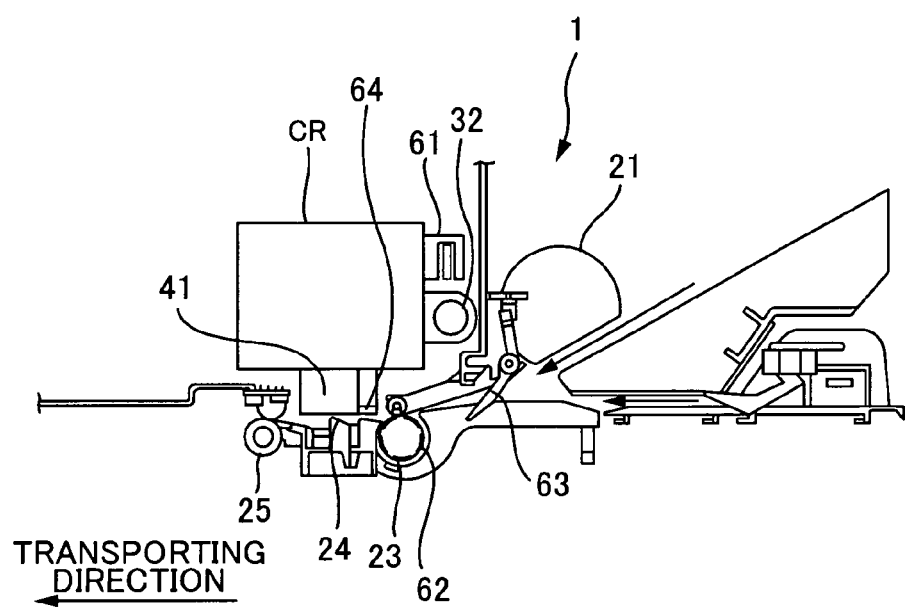
FIG. 3B is a side view illustrating the structure of the printer.

This section below describes the configuration of the printer 1. Here, FIG. 3A is a diagram showing the structure of the printer 1 in this embodiment. FIG. 3B is a side view illustrating the structure of the printer 1 in this embodiment. In the explanation below, FIG. 2 is also referred to. This printer 1 has a paper-transportation mechanism 20, a carriage-moving mechanism 30, a head unit 40, an original-drive-signal generating circuit 50, a detector group 60 and a printer-side controller 70, as shown in FIG. 2. The original-drive-signal generating circuit 50 and the printer-side controller 70 are provided on a common controller board CTR. The head unit 40 also has a head controller HC and a head 41. In the printer 1, the printer-side controller 70 controls control targets such as the paper-transportation mechanism 20, the carriage-moving mechanism 30, the head unit 40 (the head controller HC and the head 41), and the original-drive-signal generating circuit 50. More specifically, the printer-side controller 70 controls the control targets based on the print data received from the computer 110 and makes the control targets print an image on a paper sheet S. At this time, each detector of the detector group 60 detects conditions of each section in the printer 1 and outputs a result of the detection to the printer-side controller 70. When the printer-side controller 70 receives the result of the detection from each of detectors, the printer-side controller 70 controls the control targets based on the result of the detection.

Figure 4A:
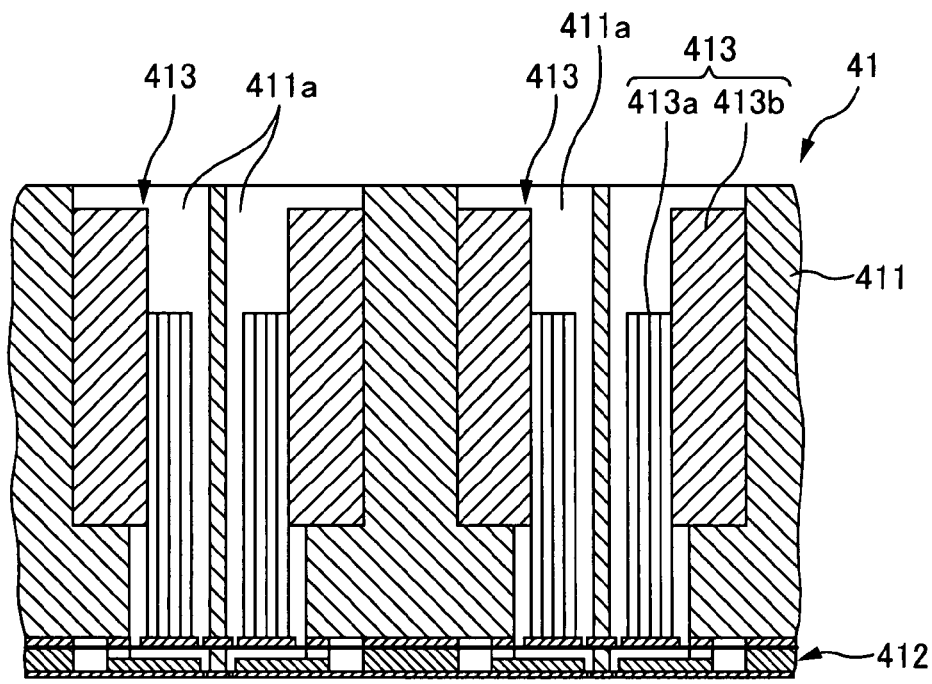
FIG. 4A is a cross-sectional view for illustrating the structure of a head.
Figure 4B:
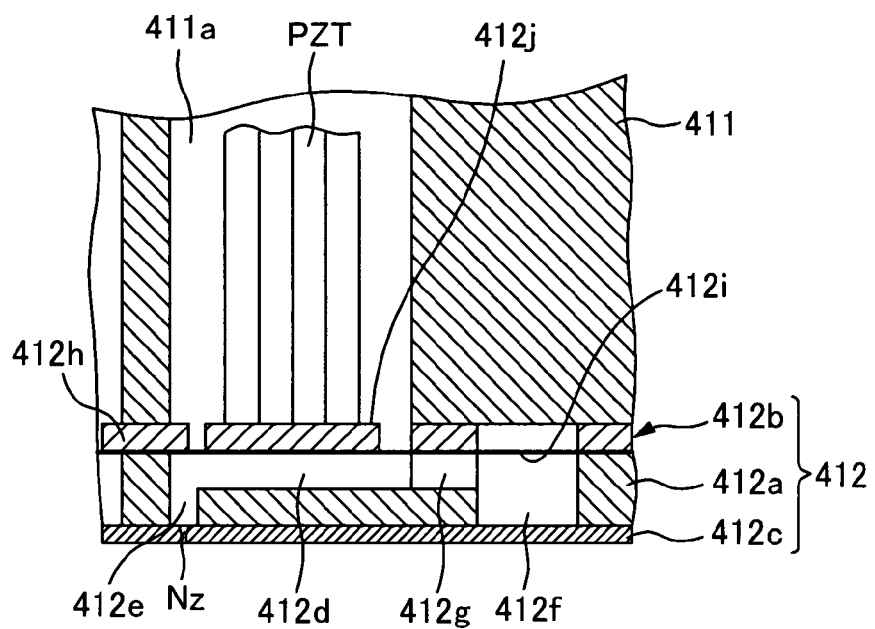
FIG. 4B is a magnified cross-sectional view showing a main section of the head.

In the printer 1, the original-drive-signal generating circuit 50, the printer-side controller 70 and the head controller HC serve as a drive-signal generating section and generate a drive signal which is applied to a piezo element PZT provided in the head 41 (see FIG. 4B). Each section which the drive-signal generating section consists of and the drive signal to be generated are described in detail later.

Regarding Paper-Transportation Mechanism 20

The paper-transportation mechanism 20 serves as a medium-transportation section for transporting a medium. The paper-transportation mechanism 20 inserts a sheet of paper S as a medium up to a printable position, and transports the paper sheet S by a predetermined transporting amount in a transporting direction. The transporting direction is a direction intersecting a carriage movement direction described below. As shown in FIGS. 3A and 3B, the paper-transportation mechanism 20 has a paper supply roller 21, a transportation motor 22, a transportation roller 23, a platen 24, and a paper discharge roller 25. The paper supply roller 21 is a roller for supplying, into the printer 1 automatically, the paper sheet S that has been inserted to a paper-insert opening, and has a D-shaped cross-section in this example. The transportation motor 22 is a motor for transporting the paper sheet S in the transporting direction, and its operation is controlled by the printer-side controller 70. The transportation roller 23 is a roller for transporting the paper sheet S which has been supplied by the paper supply roller 21 up to a printable region. The platen 24 is a member for supporting the paper sheet S from a back-side surface of the paper. The paper discharge roller 25 is a roller for transporting the paper sheet S for which printing has ended.

Regarding Carriage-Moving Mechanism 30

The carriage-moving mechanism 30 is for moving a carriage CR in the carriage movement direction; the carriage CR has the head unit 40 attached thereto. The carriage movement direction includes a movement direction from one side to the other side and a movement direction from the other side to the one side. The head unit 40 has the head 41, and therefore, the carriage movement direction is a head movement direction (a predetermined direction) in which the head 41 moves. The carriage-moving mechanism 30 also serves as a head movement section which moves the head 41 in the predetermined direction. This carriage-moving mechanism 30 has a carriage motor 31, a guide shaft 32, a timing belt 33, a drive pulley 34, and an idler pulley 35. The carriage motor 31 serves as a driving power source for moving the carriage CR. Operations of the carriage motor 31 are controlled by the printer-side controller 70. A rotating shaft of the carriage motor 31 has the drive pulley 34 attached thereto. The drive pulley 34 is arranged at the one end side of the carriage movement direction. The idler pulley 35 is arranged at the other end side of the carriage movement direction, which is located opposite the drive pulley 34. The timing belt 33 is an annular member whose end section is secured to the carriage CR, and is mounted on and extended between the drive pulley 34 and the idler pulley 35. The guide shaft 32 supports the carriage CR movably. The guide shaft 32 is attached along the carriage movement direction. Accordingly, on the operation of the carriage motor 31, the carriage CR moves along the guide shaft 32 in the carriage movement direction and the head 41 also moves to a predetermined direction.

Regarding Ink Cartridge IC

An ink cartridge IC in which ink is stored is loaded into the carriage CR. The ink cartridge IC serves as an ink storage container. The ink cartridge IC in this embodiment has a black ink cartridge ICk in which a black ink is stored and a color ink cartridge ICc in which color inks are stored. In the color ink cartridge ICc, five types of inks are stored. Specifically, a light cyan ink, a dark cyan ink, a light magenta ink, a dark magenta ink, and a yellow ink are stored. Among these inks, a group of the dark cyan ink and the light cyan ink, and a group of the dark magenta ink and the light magenta ink serve as groups of a dark ink and a light ink that are used in printing of multi-level darkness/lightness of a certain color. More specifically, the group of the dark cyan ink and the light cyan ink serves as the group of the dark ink and the light ink that are used in printing of multi-level darkness/lightness of cyan, and the group of the dark magenta ink and the light magenta ink serves as the group of the dark ink and the light ink that are used in printing of multi-level darkness/lightness of magenta. The light cyan ink is prepared such that a ratio of a density of the light cyan ink is 1/n to a density of the dark cyan ink. This density ratio can be obtained by comparing an optical density obtained in the case of printing with the dark cyan ink on a certain sheet of paper S as if most of unit regions are filled with dots and an optical density obtained in the case of printing with the light cyan ink on the same paper sheet S as if most of the unit regions are filled with dots, for example. In this embodiment, the density of the light cyan ink is ⅓ the density of the dark cyan ink. Accordingly, if converting an ink amount of the light cyan ink to the dark cyan ink, the amount is ⅓. Note that the section above describes about the cyan ink, and it is the same as mentioned above for the magenta ink. In the specification, an ink amount obtained in conversion of the light ink to the dark ink is hereinafter referred to as an equivalent amount (an equivalent ink amount). For example, if converting 7.0 pL of the light ink to the dark ink, the equivalent amount is approximately 2.3 pL.

As shown in FIG. 2, the ink cartridge IC is furnished with an ink-cartridge memory ICm. The ink-cartridge memory ICm consists of a non-volatile memory. The ink-cartridge memory ICm stores ink-type information that indicates types of stored inks. The ink-cartridge memory ICm also stores other information, including consumption-amount information relating to ink consumption. The ink-cartridge memory ICm is furnished with a contact terminal (for convenience of explanation, hereinafter referred to as a memory-side contact terminal TM1). The memory-side contact terminal TM1 is in contact with a contact terminal on a carriage side (for convenience of explanation, hereinafter, referred to as a carriage-side contact terminal TM2) while the ink cartridge IC is loaded into the carriage CR. The carriage-side contact terminal TM2 is connected to the printer-side controller 70 (a CPU 72) via wiring. Accordingly, while the ink cartridge IC is loaded, the printer-side controller 70, which constitutes a part of the drive-signal generating section, can obtain the ink type information and the consumption-amount information.

Regarding Head Unit 40

Figure 5:
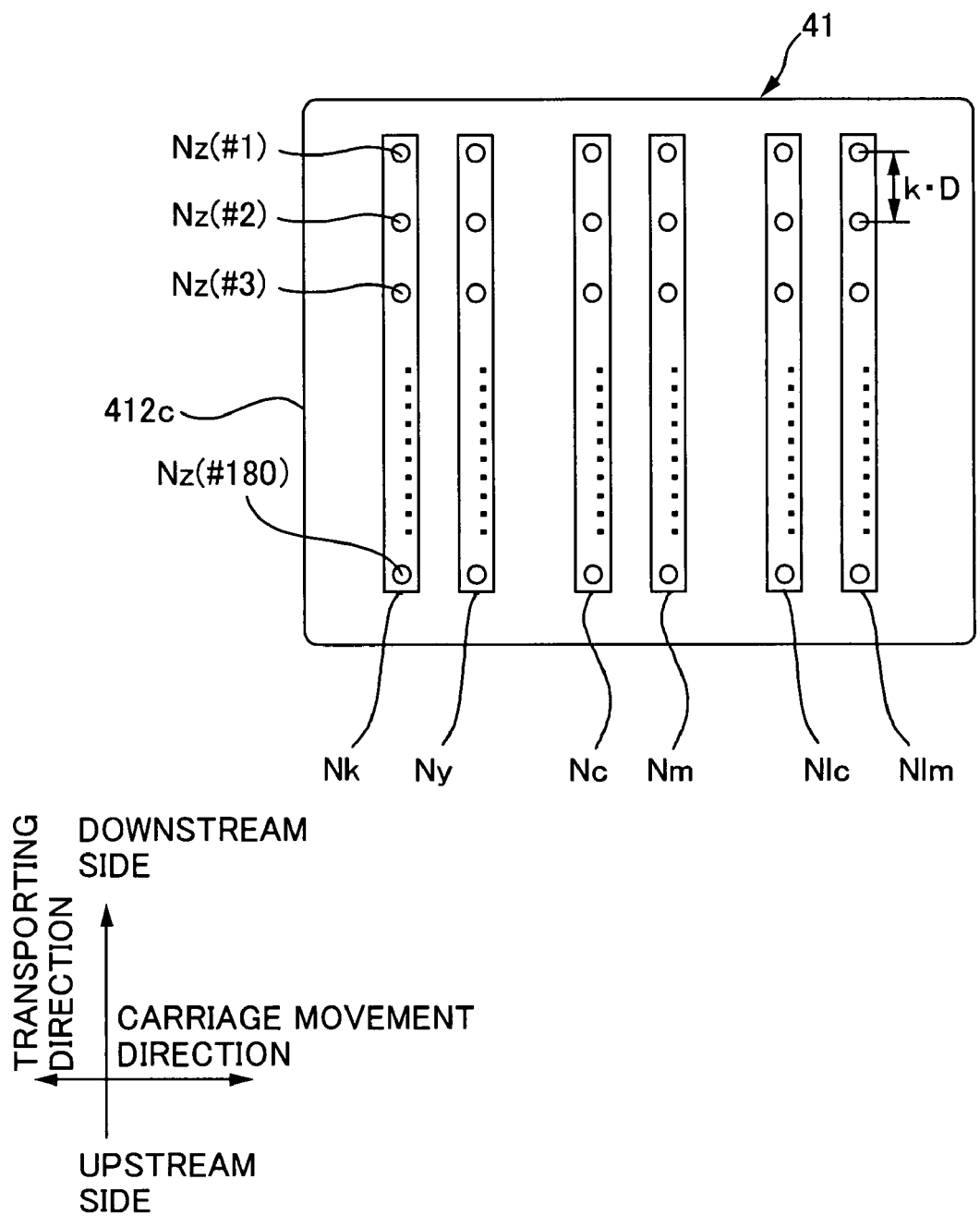
FIG. 5 is a diagram illustrating the arrangement of nozzle rows.

The head unit 40 is for ejecting ink to a paper sheet S. This head unit 40 has the head 41 and the head controller HC. The section below describes the head unit 40. Here, FIG. 4A is a cross-sectional view for illustrating the structure of the head 41. FIG. 4B is a magnified cross-sectional view showing the main section of the head 41. FIG. 5 is a diagram illustrating the arrangement of nozzle rows.

Regarding Head 41

The head 41 has a case 411, a flow-path unit 412, and piezo element units 413. The case 411 is a block-like member in which containment chambers 411*a* for containing the piezo element units 413 are formed. Each of the piezo element units 413 is attached for each of the nozzle rows. As shown in FIG. 5, there are six nozzle rows (Nk through Nlm) in the head 41. Therefore, the case 411 is furnished with the six containment chambers 411*a*, and the six piezo element units 413 are contained in the respective containment chambers 411*a* corresponding thereto. Note that FIG. 4A shows some of the containment chambers 411*a*.

The flow-path unit 412 has a flow-path forming plate 412*a*, an elastic plate 412*b* which is joined to one surface of the flow-path forming plate 412*a*, and a nozzle plate 412*c* which is joined to the other surface of the flow-path forming plate 412*a*. The flow-path forming plate 412*a* is formed from a silicon wafer, a metal plate, or the like. The flow-path forming plate 412*a* has groove portions which serve as pressure chambers 412*d*, through openings which serve as nozzle link openings 412*e*, through openings which serve as shared ink chambers 412*f*, and groove portions which serve as ink supply paths 412*g*, formed therein. The elastic plate 412*b* has a support frame 412*h*, and has island sections 412*j* to which a tip of each piezo element PZT is joined. In the periphery of each island section 412*j*, an elastic region is formed by an elastic film 412*i*.

Each of the piezo element units 413 consists of a piezo element group 413*a* and an adhesive substrate 413*b*. The piezo element group 413*a* is in a comb-teeth shape, and each one of comb teeth is a piezo element PZT. The piezo element group 413*a* has piezo elements PZT the number of which is equivalent to nozzles Nz. The adhesive substrate 413*b* is a rectangular board; the piezo element group 413*a* adheres to one surface of the substrate 413*b*, and the case 411 adheres to the other surface of the substrate 413*b*. The piezo element PZT deforms by applying electric potential difference between opposite electrodes. In this example, the piezo element PZT extends or contracts in a longitudinal direction thereof. An amount of the extension or contraction is decided depending on an electric potential of the piezo element PZT. The electric potential of the piezo element PZT is decided depending on an applied drive signal (shown with solid lines in FIGS. 11A and 11B). Accordingly, the piezo element PZT extends or contracts depending on an electric potential of the applied drive signal.

When the piezo element PZT extends or contracts, the island section 412j is pushed towards the pressure chamber 412d or is pulled in the opposite direction. At this time, since the elastic film 412i around the island section deforms, ink can be ejected efficiently from nozzles Nz. The piezo element PZT mentioned above serves as an element which is charged and discharged by the drive signal and performs an operation for ejecting ink. If the piezo element PZT is used on the head 41, the amount and speed of ink to be ejected can be controlled diversely in accordance with a shape of applied drive pulses PS1 through PS4 (see FIG. 7).

Also, the above-mentioned nozzle plate 412c is provided on a paper-facing surface of the head 41. The nozzle plate 412c is furnished with a plurality of the nozzle rows, each consisting of a plurality of nozzles Nz; the number of the nozzle rows corresponds to the number of the types of inks. Since six types of inks can be ejected in the printer 1 as mentioned above, the number of the nozzle rows is six. In the example shown in FIG. 5, a black ink nozzle row Nk, a yellow ink nozzle row Ny, a cyan ink nozzle row Nc, a magenta ink nozzle row Nm, a light cyan ink nozzle row Nlc, and a light magenta ink nozzle row Nlm are provided in the order from left to right. Each of the nozzle rows is formed parallel to the transporting direction. The nozzle rows are lined parallel to one another in the carriage movement direction.

Regarding Head Controller HC

Next, the head controller HC is described. Here, FIG. 6 is a block diagram for illustrating the configuration of the head controller HC. As mentioned above, the head controller HC constitutes apart of the drive-signal generating section. The head controller HC in this embodiment has shift registers 81, latch circuits 82, a control logic 83, decoders 84, gate circuits 85, and head switches 86. Each of the sections except the control logic 83 (that is, the shift register 81, the latch circuit 82, the decoder 84, the gate circuit 85, and the head switch 86) is provided respectively for each piezo element PZT, that is, for each nozzle Nz. Also, the head controller HC is provided for each type of inks. Since the printer 1 can eject the six types of the inks as mentioned above, six of blocks illustrated in FIG. 6 are provided. Each of the sections which the head controller HC consists of is described below.

The shift register 81 is a section in which dot formation data SI that comes from the printer-side controller 70 is set. The latch circuit 82 latches the dot formation data SI that has been set in the shift register 81.

The control logic 83 serves as a switch-operation information storing section, and stores switch-operation information (q0 through q3) according to which operations of the head switch 86 are determined. The control logic 83 outputs the pieces of the switch-operation information q0 through q3 that are stored while changing the level of each piece of switch-operation information at timings decided by a latch signal LAT and a change signal CH (see FIG. 7). In short, the control logic 83 performs outputting chronologically. The control logic 83 stores the switch-operation information for each type of the dot formation data SI (each type of the dot tone values), more specifically, for each of non-formation of a dot (data "00"), formation of a small dot (data "01"), formation of a medium dot (data "10"), and formation of a large dot (data "11"). In this example, non-formation of a dot is a minimum dot tone value among a plurality of the dot tone values, and formation of a small dot is a minimum dot tone value in ejection of ink. In addition, formation of a large dot is a maximum dot tone value.

Since the control logic 83 is provided on each of the blocks that are each decided for the type of ink, the switch-operation information that is to be stored is decided according to the type of to-be-ejected ink. More specifically, switch-operation information for black ink, switch-operation information for light cyan ink, switch-operation information for dark cyan ink, . . . are decided. Therefore, the control logic 83 in each of the blocks stores switch-operation information corresponding to the type of to-be-ejected ink, for each type of the dot formation data SI (the dot tone values). The switch-operation information stored in the control logic 83 is described later.

The decoder 84 selects the switch-operation information (q0 through q3) which is outputted by the control logic 83, according to the dot formation data SI latched by the latch circuit 82, and the decoder 84 outputs the selected switch-operation information to the head switch 86 via the gate circuit 85. Here, the switch-operation information outputted by the control logic 83 has not been processed by selection by the decoder 84, and therefore, it can be also referred to as "unselected switch-operation information". On the other hand, the switch-operation information applied to the head switch 86 has already been processed by selection by the decoder 84, and therefore, it can be referred to as "selected switch-operation information". Accordingly, the decoder 84 can be deemed to select a piece of the unselected switch-operation information corresponding to a tone level, from among a plurality of the types of the unselected switch-operation information which are outputted simultaneously, and to output the certain type of unselected switch-operation information as the selected switch-operation information. This configuration enables to operate processes at higher speed because the certain type of the switch-operation information that is selected from among a plurality of the types of the unselected switch-operation information is outputted as the selected switch-operation information.

The gate circuit 85 is for applying to the head switch 86 the switch-operation information from the decoder 84 and an N-charge signal N_CHG from the printer-side controller 70. Here, the N-charge signal N_CHG is a forced-application signal for applying an original drive signal COM (see FIG. 7) to all piezo elements PZT in the block, and is used for adjusting an electric potential of each piezo element PZT. The N-charge signal N_CHG becomes effective when the signal is at L-level. Accordingly, when the N-charge signal N_CHG is at H-level, an output level of the gate circuit 85 changes according to the switch-operation information from the decoder 84. On the other hand, when the N-charge signal N_CHG is at L-level, the output level of the gate circuit 85 becomes H-level regardless of the switch-operation information from the decoder 84.

The head switch 86 is a switch operating according to the switch-operation information or the N-charge signal N_CHG that are each inputted via the gate circuit 85. The head switch 86 is arranged between a piezo element PZT and a line for supplying the original drive signal COM; the head switch 86 applies the original drive signal COM to the piezo element PZT in the ON state and cuts off the original drive signal COM in the OFF state. The line for supplying the original drive signal COM is connected to the original-drive-signal generating circuit 50. Accordingly, in other words, the head switch 86 is arranged between the original-drive-signal generating circuit 50 and a piezo element PZT. When the N-charge signal N_CHG is at H-level, the head switch 86 changes between the ON/OFF states according to the switch-operation information selected by the decoder 84, and applies to the piezo element PZT a necessary portion of the original drive signal COM (that is, the drive signal). Accordingly, the head switch 86 serves as a switch for generating a drive signal that is to be applied to the piezo element PZT, from the original drive signal COM.

Also, sections for controlling the operations of the head switch 86, specifically, the shift register 81, the latch circuit 82, and the decoder 84, serve as a switch controller. The switch controller generates the selected switch-operation information from dot formation data SI (a dot tone value) and the unselected switch-operation information. Operations of the shift register 81, the latch circuit 82, the control logic 83 and the decoder 84 are described later.

Regarding Original-Drive-Signal Generating Circuit 50

The original-drive-signal generating circuit 50 is for generating the original drive signal COM, and serves as an original-drive-signal generating section. Here, the original drive signal COM is a signal which is a base for the drive signal which is for driving the piezo elements PZT, as mentioned above.

Figure 7:
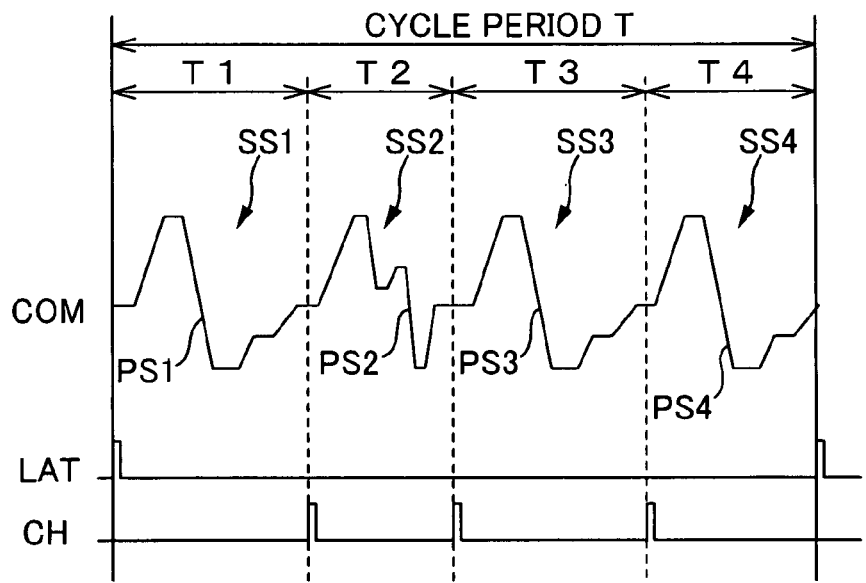
FIG. 7 is a diagram illustrating an original drive signal.

As shown in FIG. 7, the original drive signal COM is generated repeatedly every cycle period T. The cycle period T can be divided into four periods T1 through T4. The original drive signal COM has a first-period signal SS1 generated in the first period T1, a second-period signal SS2 generated in the second period T2, a third-period signal SS3 generated in the third period T3, and a fourth-period signal SS4 generated in the fourth period T4. The first-period signal SS1 has a first drive pulse PS1, and the second-period signal SS2 has a second drive pulse PS2. Also, the third-period signal SS3 has a third drive pulse PS3, and the fourth-period signal SS4 has a fourth drive pulse PS4 respectively. These drive pulses PS1 through PS4 each serve as waveform sections for operating the piezo elements PZT, and their respective shapes are determined based on the operation performed by the piezo element PZT.

These drive pulses PS1 through PS4 are waveform sections which are used when ink is ejected from the nozzle Nz. Among these drive pulses, all of the first drive pulse PS1, the third drive pulse PS3, and the fourth drive pulse PS4 have the same waveform. When any one of the drive pulses PS1, PS3, and PS4 is applied to a piezo element PZT, ink of a predetermined amount is ejected from a nozzle Nz. For example, approximately 7 pL (approximately 7 ng) of ink is ejected. When the ink lands on a sheet of paper S, a dot having the size corresponding to the ink is formed in a unit region of the paper sheet S. In addition, when any two or all of these drive pulses PS1, PS3, and PS4 are applied to a piezo element PZT, ink of an amount corresponding to the pulses (approximately 14 pL or approximately 21 pL) is ejected from a nozzle Nz and a dot having the size corresponding to the ejected amount is formed on the paper sheet S. The second drive pulse PS2 is a waveform section that is for ejecting ink of another predetermined amount that is less than the above-mentioned first drive pulse PS1, etc. If the second drive pulse PS2 is applied to a piezo element PZT, approximately 2.5 pL of ink is ejected, for example. If this ink lands on the paper sheet S, a dot that is smaller than a dot formed by the first drive pulse PS1 is formed on the paper sheet S.

Figure 8:
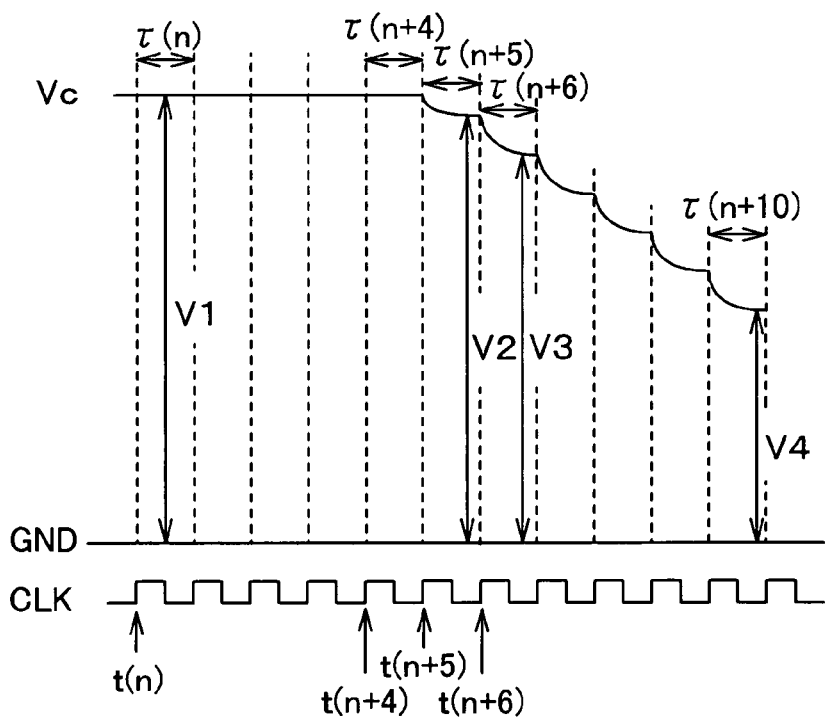
FIG. 8 is a chart illustrating the concept of the generating operation of the original drive signal.

The above-mentioned original drive signal COM is outputted by the original-drive-signal generating circuit 50, based on drive-signal generation information from the printer-side controller 70. A generating operation of the original drive signal COM by the original-drive-signal generating circuit 50 is described below. FIG. 8 is a chart illustrating the concept of the generating operation of the original drive signal COM.

The printer-side controller 70 obtains an output voltage for each refresh cycle period $\tau$ based on a parameter that is for generating the original drive signal COM. If an original drive signal COM is generated, the printer-side controller 70 obtains a DAC value corresponding to the output voltage (waveform generation information; for example, information indicating the output voltage in the form of a 10-bit digital value), and outputs the obtained DAC value to the original-drive-signal generating circuit 50 every refresh cycle period $\tau$. In the example of FIG. 8, the DAC value corresponding to voltage V1 is outputted at intervals of timing t (n) decide by a clock signal CLK. As a result thereof, in the refresh cycle period $\tau$ (n), the output of the original-drive-signal generating circuit 50 is voltage V1. Since, until the refresh cycle period $\tau$ (n+4), the DAC value corresponding to voltage V1 is outputted in sequence, the original-drive-signal generating circuit 50 continues to output voltage V1. In addition, at the timing t (n+5), the DAC value corresponding to voltage V2 is outputted. As a result thereof, in the refresh cycle period $\tau$ (n+5), the output of the original-drive-signal generating circuit 50 declines from voltage V1 to voltage V2. Also, at the timing t (n+6), the DAC value corresponding to voltage V3 is outputted. As a result thereof, in the refresh cycle period $\tau$ (n+6), the output of the original-drive-signal generating circuit 50 declines from voltage V2 to voltage V3. Since the DAC value is outputted in the same manner as mentioned above, the voltage outputted by the original-drive-signal generating circuit 50 declines gradually. In the refresh cycle period $\tau$ (n+10), the output of the original-drive-signal generating circuit 50 becomes voltage V4. Note that a terminal of the original-drive-signal generating circuit 50 on the non-outputting side is grounded. Accordingly, a terminal on the outputting side is at an electric potential corresponding to the output voltage.

Regarding Detector Group 60

The detector group 60 is for monitoring conditions of the printer 1. As shown in FIGS. 3A and 3B, the detector group 60 includes a linear encoder 61, a rotary encoder 62, a paper detector 63, and a paper-width detector 64. The linear encoder 61 is for detecting a position of the carriage CR in the carriage movement direction. The rotary encoder 62 is for detecting an amount of rotation of the transportation roller 23. The paper detector 63 is for detecting a sheet of paper S to be printed. The paper-width detector 64 is for detecting a width of the paper sheet S to be printed.

Regarding Printer-Side Controller 70

The printer-side controller 70 is for controlling each section provided on the printer 1. For example, the printer-side controller 70 makes the printer print an image on a sheet of paper S by making the sections of the printer alternately perform an operation in which the paper sheet S is transported by the predetermined transporting amount and an operation in which ink is ejected intermittently while the carriage CR (the head 41) is moving. Therefore, the printer-side controller 70 controls transportation of the paper sheet S by controlling rotation of the transportation motor 22. The printer-side controller 70 also controls movement of the carriage CR by controlling rotation of the carriage motor 31. Besides, the printer-side controller 70 performs control for ejecting ink, by outputting dot formation data SI to the head controller HC. As mentioned above, the dot formation data SI is for being used when generating, from the original drive signal COM, the drive signal that is applied to a piezo element PZT. In addition, the printer-side controller 70 performs control in which the DAC value as information designating voltage is outputted to the original-drive-signal generating circuit 50. In this way, the printer-side controller 70 performs a control for generating the original drive signal COM and a control for generating from the original drive signal COM the drive signal that is applied to a piezo element PZT. Therefore, it can be said that the printer-side controller 70 together with the original-drive-signal generating circuit 50, the head switch 86, and the head controller HC constitutes the drive-signal generating section.

The printer-side controller 70 has an interface section 71, the CPU 72, a memory 73, and a control unit 74, as shown in FIG. 2. The interface section 71 exchanges data between the computer 110, which is an external device, and the printer-side controller 70. The CPU 72 is a processing unit for carrying out overall control of the printer 1. The memory 73 is for reserving a work area and a storage area for the programs for the CPU 72, for instance, and is composed of storage devices such as a RAM, an EEPROM, a ROM or the like. The CPU 72 controls each of the control targets in accordance with the computer programs stored in the memory 73. For example, the CPU 72 controls the paper-transportation mechanism 20, the carriage-moving mechanism 30 and the like via the control unit 74. For example, the CPU 72 outputs a control signal which is for the transportation motor 22, the carriage motor 31 or the like. Also, the CPU 72 outputs to the head controller HC a head control signal (the clock signal CLK, the dot formation data SI, the latch signal LAT, the change signal CH, and the N-charge signal N_CHG, for example; see FIG. 6) that is for controlling operations of the head 41, and the CPU 72 outputs to the original-drive-signal generating circuit 50 the DAC value that is for generating the original drive signal COM.

Printing Operation

Overview of Printing Operation in this Embodiment

Next, a printing operation in the printing system 100 is described. First, the overview of the printing operation is described. As mentioned above, the printer 1 provided in the printing system 100 can perform printing in each unit region using a plurality of types of dots. Specifically, the printer 1 can perform printing in the region using four types of the dot formation data SI (the dot tone values): non-formation of a dot, formation of a small dot, formation of a medium dot, and formation of a large dot. Here, if a same amount of ink is used between the light ink and the dark ink for each type of dots, there is a possibility in which graininess of an image deteriorates when the image has a certain density.

It is considered that this is caused by difference in necessary amounts of ink between the light ink and the dark ink for each dot tone level. For example, while a large dot of the dark ink is considered having an appropriate ink amount in order to fill most of unit regions with dots, it is preferable that an ink amount of a large dot with the light ink is appropriate to a shifting density from the light ink to the dark ink. Besides, it is preferable that an ink amount of a small dot with the dark ink is appropriate to the shifting density from the light ink to the dark ink, and it is preferable that an ink amount of a small dot with the light ink is appropriate to an extremely light density. With respect to this point, an amount of ink ejected for each dot tone level in a conventional printer was set to either one of a necessary amount of the dark ink and a necessary amount of the light ink. This limits an image-density range represented by a certain dot that is formed with the light ink, and also limits an image-density range represented by another dot that is formed with the dark ink. It is considered that this results in deterioration in graininess.

Thus, in this embodiment, a drive pulse (a waveform section) that is for the dark ink and that corresponds to the minimum dot tone value in ejection of ink is made different from a drive pulse that is for the light ink and that corresponds to this minimum dot tone value. And also, a drive pulse that is for the dark ink and that corresponds to the maximum dot tone value is made different from a drive pulse that is for the light ink and that corresponds to this maximum dot tone value. This makes the image-density ranges that are represented more flexible. And, the light ink is mainly used in a range in which the image density is low therein, and the dark ink is mainly used in a range in which the image density is high therein. As a result thereof, a density range in which a dot with the dark ink and a dot with the light ink are present in a mixed state becomes narrower than a conventional case, so that graininess can be improved. The section below describes these points in detail. Regarding Printing Operation When an image is printed on a sheet of paper S in the illustrated printing system 100, a process for generating print data and a process for printing an image on the paper sheet S based on the print data are performed. The process for generating the print data is performed by the computer 110 of the printing system 100. More specifically, the CPU 113 included in the host-side controller 111 operates according to a computer program stored in the memory 114 and performs the process. Accordingly, the computer program contains codes for performing each process. Besides, the process for printing the image on the paper sheet S is performed by the printer 1 included in the printing system 100. More specifically, the CPU 72 of the printer-side controller 70 operates according to a computer program stored in the memory 73 and performs the process. Accordingly, the computer program contains codes for performing each process.

Regarding Process for Generating Print Data

Figure 9:
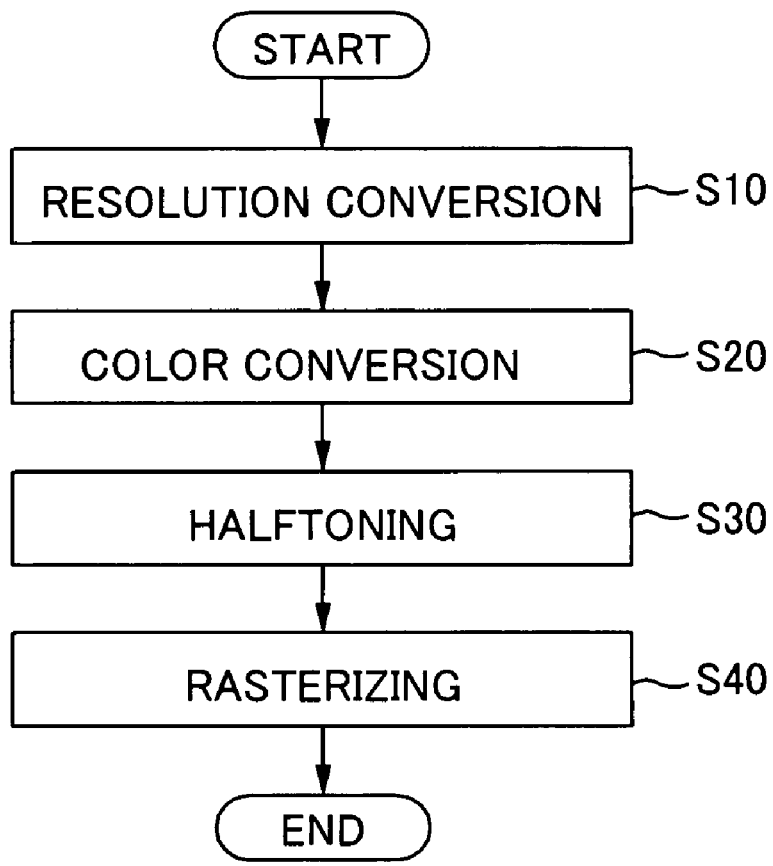
FIG. 9 is a flowchart for illustrating a process for generating print data.

First, the process for generating print data is described. Here, FIG. 9 is a flowchart for illustrating the process for generating print data. As shown in FIG. 9, in the process for generating print data, a resolution conversion (S10), a color conversion (S20), a halftoning (S30), and a rasterizing (S40) are performed.

The resolution conversion is a process for converting image data (text data, picture data, and the like) into a resolution with which an image is to be printed on a sheet of paper S (this is a spacing between dots in printing and is also referred to as a "print resolution"). The color conversion is a process for converting each piece of RGB pixel data in RGB image data into data having multiple levels of tone values which are expressed in the CMYK color space (for example, 256 tone levels of printing tone values). For example, the color conversion is performed by referring to a table in which RGB tone values are associated with CMYK tone values (Color Conversion Lookup Table).

The halftoning is a process for converting CMYK pixel data having multiple levels of dot tone values into data having fewer levels of tone values that can be formed by the printer 1. In other words, the halftoning is a process for obtaining dot formation data SI from the CMYK pixel data having multiple levels of tone values. The halftoning enables to obtain 2-bit dot formation data SI (four types of dot tone values) from CMYK pixel data having 256-level tone values, for example. In the printing system 100, two types of halftonings are defined. The first halftoning is a process selected when printing of multi-level darkness/lightness is performed with a light ink and a dark ink of a certain color. In the printing system 100, the first halftoning is a process selected in the case of cyan and magenta. The second halftoning is a process selected in the case of a color for which printing is performed with an ink with one type of density. In the printing system 100, the second halftoning is a process selected in the case of yellow and black. These halftonings are described later.

The rasterizing is a process for rearranging dot formation data SI obtained by the halftoning in an order for transmission to the printer 1. The rasterized dot formation data SI is outputted to the printer 1 as print data, together with the above-mentioned command data.

Regarding Process for Printing Image on Paper Sheet S

Figure 10:
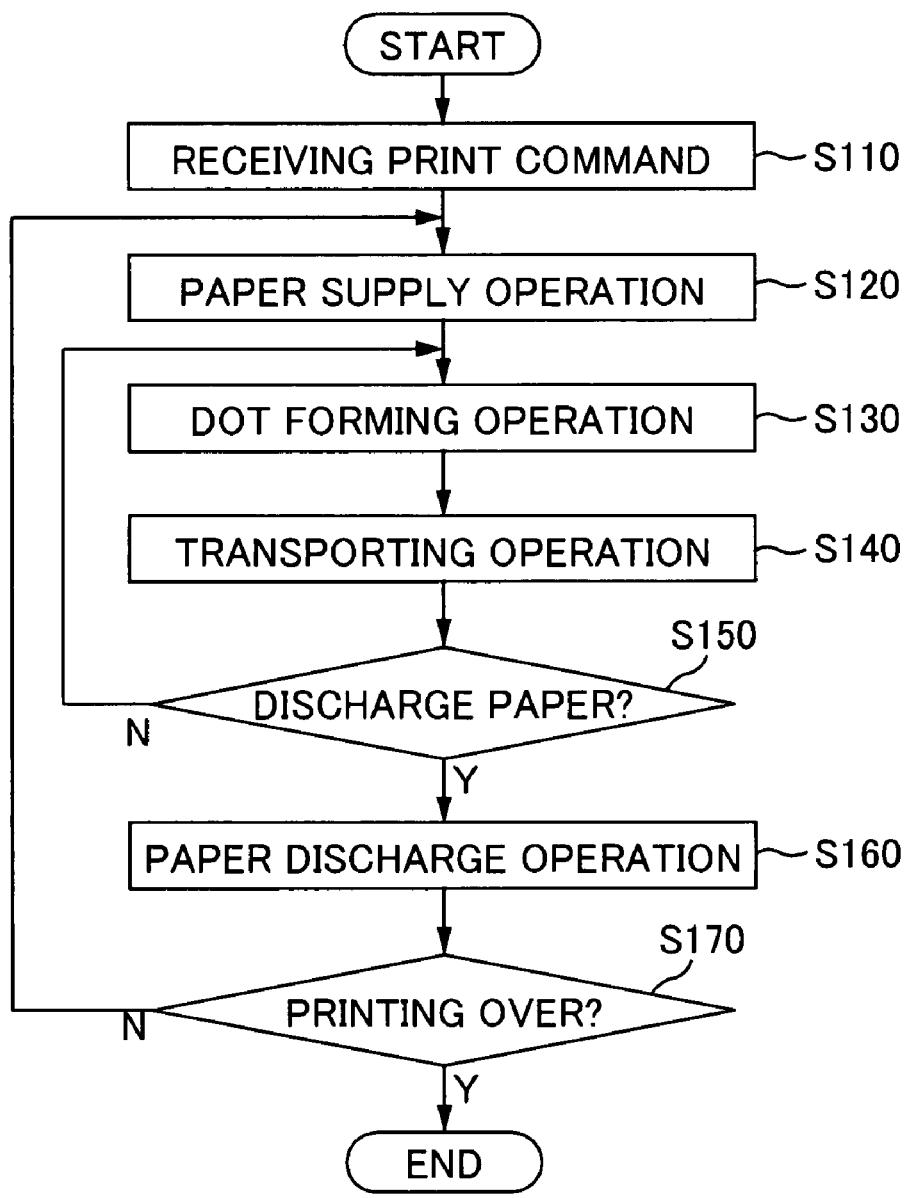
FIG. 10 is a flowchart showing processes in printing.

Next, a process which is performed by the printer 1 for printing an image on a sheet of paper S is described. Here, FIG. 10 is a flowchart showing the process in printing. As shown in FIG. 10, in the process for printing an image on a paper sheet S, an operation of receiving a print command (S110), a paper supply operation (S120), a dot forming operation (S130), a transporting operation (S140), a paper discharge determination (S150), a paper discharge operation (S160), and a print ending determination (S170) are performed.

In the operation of receiving a print command, the printer-side controller 70 receives a print command from the computer 110 via the interface section 71. This print command is included in print data transmitted from the computer 110. The paper supply operation is an operation for moving a sheet of paper S to be printed and positioning the paper sheet S at a print start position (that is, an indexed position). In this paper supply operation, the printer-side controller 70 transports the to-be-printed paper sheet S to the transportation roller 23 by rotating the paper supply roller 21. Next, the printer-side controller 70 positions the paper sheet S that has been transported from the paper supply roller 21 at the print start position by rotating the transportation roller 23. The dot forming operation is an operation for forming a dot on the paper sheet S by ejecting ink intermittently from the head 41, which moves in the carriage movement direction. The printer-side controller 70 moves the carriage CR in the carriage movement direction by causing the carriage motor 31 to drive it. Also, while the carriage CR is moving, the printer-side controller 70 causes the head 41 (the nozzles Nz) to eject ink in accordance with the dot formation data SI. As mentioned above, a dot is formed on the paper sheet S when ink ejected by the head 41 lands on the paper sheet S. Note that the dot forming operation is described in detail later. The transporting operation is an operation for moving the paper sheet S relative to the head 41 in the transporting direction. The printer-side controller 70 transports the paper sheet S in the transporting direction by rotating the transportation roller 23. This transporting operation enables the head 41 to form a dot at a position which is different from the position of the dot formed in the preceding dot forming operation. The paper discharge determination is a process for determining whether or not to discharge the paper sheet S being printed. This determination is performed based on the presence or absence of print data. More specifically, the printer-side controller 70 checks the presence or absence of print data that is to be printed on the paper sheet S being printed, and determines not to discharge the paper sheet if there remains print data. In this case, the printer-side controller 70 gradually prints an image consisting of dots on the paper sheet S by alternately repeating the dot forming operation and the transporting operation until there is no more print data to be printed. The printer-side controller 70 determines to discharge the paper if there is no more print data, and discharges the printed paper sheet S out of the printer by rotating the paper discharge roller 25. It should be noted that whether or not to discharge the paper sheet may also be determined based on a paper discharge command included in the print data. The print ending determination is a determination on whether or not to continue printing. In this determination, the printer-side controller 70 checks the presence or absence of print data. If a next sheet of paper S is to be printed, the printer-side controller 70 performs the paper supply operation for the next paper sheet S. If the next paper sheet S is not to be printed, the printing operation is terminated.

Dot Forming Operation and Halftoning

Regarding Dot Forming Operation

Figure 11A:
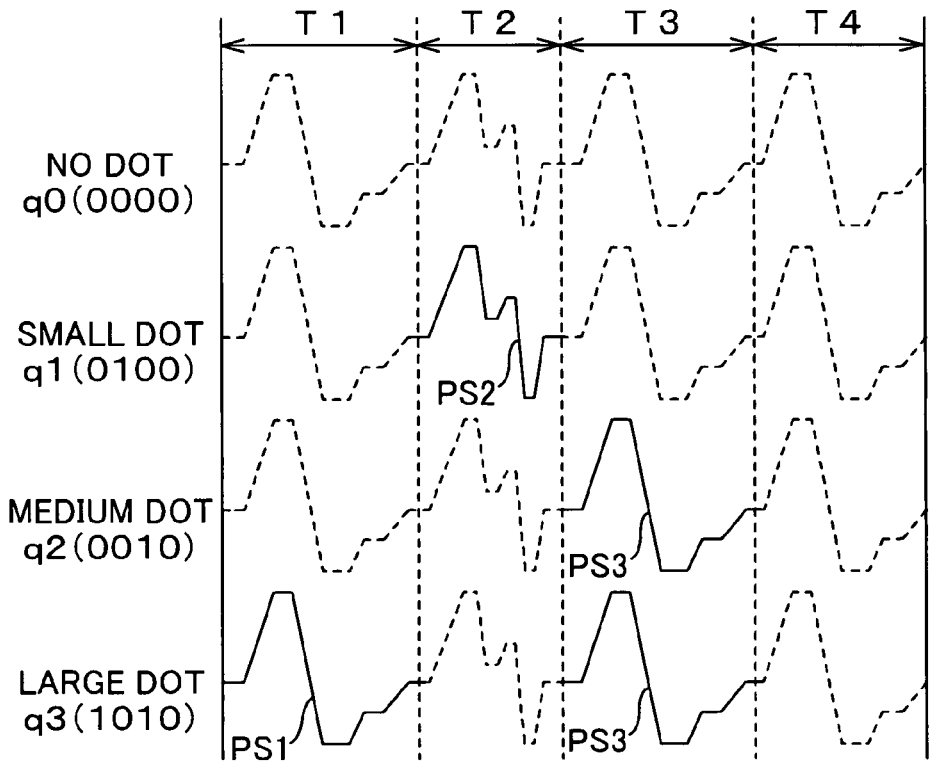
FIG. 11A is a diagram showing drive signals generated in ejection of a light cyan ink and a light magenta ink, for each tone level.
Figure 11B:
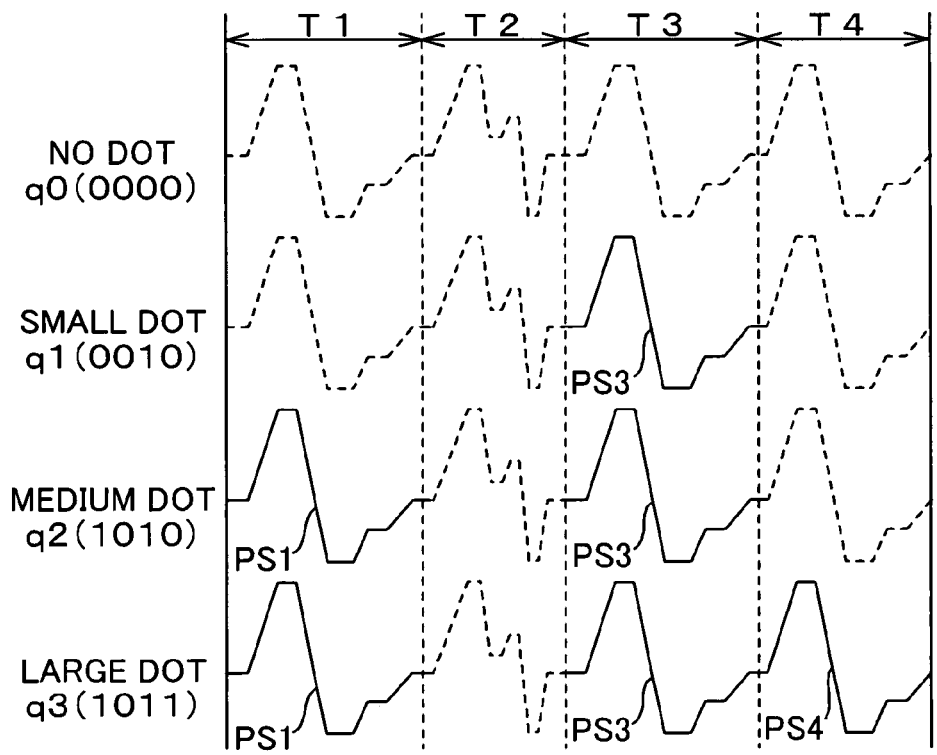
FIG. 11B is a diagram showing drive signals generated in ejection of a dark cyan ink, a dark magenta ink, a yellow ink, and a black ink, for each tone level.

This section describes the dot forming operation in detail. FIG. 11A is a diagram showing drive signals generated in ejection of the light cyan ink and the light magenta ink, for each tone level. FIG. 11B is a diagram showing drive signals generated in ejection of the dark cyan ink, the dark magenta ink, the yellow ink, and the black ink, for each tone level. FIG. 12 is a table showing the first drive pulse PS1 through the fourth drive pulse PS4 that are each applied to a piezo element PZT, for each type of the inks and each tone level. FIG. 13 is a table showing, for each type of the dot formation data SI, ejected ink amounts of the light cyan ink and the dark cyan ink, and equivalent amounts of the light cyan ink to the dark cyan ink.

In the dot forming operation, the printer-side controller 70 outputs a DAC value to the original-drive-signal generating circuit 50, and the original-drive-signal generating circuit 50 outputs to the head unit 40 a voltage signal corresponding to the DAC value. More specifically, the original-drive-signal generating circuit 50 generates an original drive signal COM that has a voltage specified by the DAC value. The generation of the original drive signal COM is performed repeatedly every time the latch signal LAT changes to H-level. As a result thereof, the original drive signal COM illustrated in FIG. 7 is generated repeatedly at every cycle period T. More specifically, the first-period signal SS1 having the first drive pulse PS1 is generated in the period T1, and the second-period signal SS2 having the second drive pulse PS2 is generated in the period T2. Also, the third-period signal SS3 having the third drive pulse PS3 is generated in the period T3, and the fourth-period signal SS4 having the fourth drive pulse PS4 is generated in the period T4. The drive pulses PS1, PS3, and PS4 have the same waveform, and when any one of these drive pulses is applied to a piezo element PZT, approximately 7.0 pL of ink is ejected. When the second drive pulse PS2 is applied to a piezo element PZT, approximately 2.5 pL of ink is ejected.

In the dot forming operation, the printer-side controller 70 transmits to the head controller HC dot formation data SI included in print data, and outputs the latch signal LAT and the change signal CH to the head controller HC at a predetermined timing. In the head controller HC, the dot formation data SI transmitted from the printer-side controller 70 is set in the shift register 81 sequentially. The latch circuit 82 latches dot formation data SI corresponding thereto at a timing of receiving the latch signal LAT (at a timing when the latch signal LAT changes to H-level).

The latch signal LAT is also inputted to the control logic 83 of the head controller HC. In addition, the change signal CH is inputted to the control logic 83. The control logic 83 outputs the switch-operation information (q0 through q3) that corresponds to a type of a to-be-ejected ink and that is determined for each type of the dot formation data SI (the dot tone values). More specifically, the control logic 83 outputs the switch-operation information at a timing when the latch signal LAT or the change signal CH changes to H-level while refreshing contents of the switch-operation information at the timing. The switch-operation information is selected by the decoder 84. More specifically, the decoder 84 selects the switch-operation information q0 if dot formation data SI (a dot tone value based on the size of a to-be-formed dot) outputted from the latch circuit 82 indicates non-ejection, and the decoder 84 selects the switch-operation information q1 if the dot formation data SI indicates formation of a small dot. In the same way, the decoder 84 selects the switch-operation information q2 if the data SI indicates formation of a medium dot, and the decoder 84 selects switch-operation information q3 if the data SI indicates formation of a large dot. The selected switch-operation information is outputted to the head switch 86. As a result thereof, the period signals SS1 through SS4 which the original drive signal COM consists of are selectively applied to a piezo element PZT. Note that these pieces of the switch-operation information are transmitted by the printer-side controller 70 and are stored in the control logic 83, for example.

In this case, the printer-side controller 70 recognizes a type of an ink that is ejected, and causes dot formation data SI that is appropriate to the ink to be stored in the control logic 83. Here, as mentioned above, in this embodiment, the printer-side controller 70 recognizes the type of the ink that is ejected, based on ink-type information stored in the ink-cartridge memory ICm. This enables to perform the recognition surely. In addition, it is also possible to perform adjustment automatically in the case of replacement of an ink cartridge IC storing a different type of ink.

Next, an operation in which the original drive signal COM is applied to a piezo element PZT according to the switch-operation information, that is, generating operation of drive signals is described. As shown in FIG. 11A, with respect to switch-operation information used for the light cyan ink and the light magenta ink (for convenience of explanation, also referred to as "for-light-ink switch-operation information"), the switch-operation information q0 corresponding to dot formation data SI of non-ejection (data "00") is data "0000", and the switch-operation information q1 corresponding to dot formation data SI of a small dot (data "01") is data "0100". In the same way, the switch-operation information q2 corresponding to dot formation data SI of a medium dot (data "10") is data "0010" and switch-operation information q3 corresponding to dot formation data SI of a large dot (data "11") is data "1010".

Accordingly, for the dot formation data SI of non-ejection, no drive signal is generated, as shown in FIG. 12. For the dot formation data SI of a small dot, the second-period signal SS2 becomes a drive signal. When the second drive pulse PS2 that is included in this drive signal is applied to a piezo element PZT, approximately 2.5 pL of ink is ejected from a nozzle Nz. As a result thereof, a small dot having the size corresponding to this ink amount is formed on a sheet of paper S. Besides, for the dot formation data SI of a medium dot, the third-period signal SS3 becomes a drive signal. When the third drive pulse PS3 that is included in this drive signal is applied to a piezo element PZT, approximately 7.0 pL of ink is ejected from a nozzle Nz. As a result thereof, a medium dot having the size corresponding to this ink amount is formed on the paper sheet S. Also, for the dot formation data SI of a large dot, the first-period signal SS1 and the third-period signal SS3 become drive signals. The drive pulses PS1 and PS3 that are included in these drive signals are applied to a piezo element PZT, so that approximately 14.0 pL of ink is ejected from a nozzle Nz. As a result thereof, a large dot having the size corresponding to this ink amount is formed on the paper sheet S.

On the other hand, as shown in FIG. 11B, with respect to switch-operation information used for the dark cyan ink, the dark magenta ink, the yellow ink, and the black ink (for convenience of explanation, also referred to as for-dark-ink switch-operation information), the switch-operation information q0 corresponding to the dot formation data SI of non-ejection is data "0000", and the switch-operation information q1 corresponding to the dot formation data SI of a small dot is data "0010". In the same way, the switch-operation information q2 corresponding to the dot formation data SI of a medium dot is data "1010", and switch-operation information q3 corresponding to the dot formation data SI of a large dot is data "1011".

Accordingly, for the dot formation data SI of non-ejection, no drive signal is generated, as shown in FIG. 12. For the dot formation data SI of a small dot, the third-period signal SS3 becomes a drive signal, and approximately 7.0 pL of ink is ejected from a nozzle Nz according to the third drive pulse PS3. As a result thereof, a small dot having the size corresponding to this ink amount is formed on a sheet of paper S. Besides, for the dot formation data SI of a medium dot, the first-period signal SS1 and the third-period signal SS3 become drive signals, and approximately 14.0 pL of ink is ejected from a nozzle Nz according to the drive pulses PS1, PS3. As a result thereof, a medium dot having the size corresponding to this ink amount is formed on the paper sheet S. Also, for the dot formation data SI of a large dot, the first-period signal SS1, the third-period signal SS3, and the fourth-period signal SS4 become drive signals, and approximately 21.0 pL of ink is ejected from a nozzle Nz according to the drive pulses PS1, PS3, and PS4. As a result thereof, a large dot having the size corresponding to this ink amount is formed on the paper sheet S.

Here is a comparison of a drive signal generated according to the for-light-ink switch-operation information and a drive signal generated according to the for-dark-ink switch-operation information. First, these drive signals are compared for the dot formation data SI of a small dot, which is the minimum dot tone value in ejection of ink. For the dot formation data SI of a small dot, the second-period signal SS2 becomes a drive signal in the case of the light ink, and the third-period signal SS3 becomes a drive signal in the case of the dark ink. The light ink is ejected by applying to a piezo element PZT the second drive pulse PS2, which serves as a waveform section for a small dot. As a result thereof, approximately 2.5 pL of the light ink is ejected. The dark ink is ejected by applying to a piezo element PZT the third drive pulse PS3, which serves as a waveform section for a small dot. As a result thereof, approximately 7.0 pL of the dark ink is ejected.

For the dot formation data SI of a medium dot, the third-period signal SS3 becomes a drive signal in the case of the light ink, and the first-period signal SS1 and the third-period signal SS3 become drive signals in the case of the dark ink. The light ink is ejected by applying to a piezo element PZT the third drive pulse PS3, which serves as a waveform section for a medium dot. As a result thereof, approximately 7.0 pL of the light ink is ejected. The dark ink is ejected by applying to a piezo element PZT the first drive pulse PS1 and the third drive pulse PS3, which serve as waveform sections for a medium dot. As a result thereof, approximately 14.0 pL of the dark ink is ejected.

For the dot formation data SI of a large dot, the first-period signal SS1 and the third-period signal SS3 become drive signals in the case of the light ink, and the first-period signal SS1, the third-period signal SS3, and the fourth-period signal SS4 become drive signals in the case of the dark ink. The light ink is ejected by applying to a piezo element PZT the first drive pulse PS1 and the third drive pulse PS3, which serve as waveform sections for a large dot. As a result thereof, approximately 14.0 pL of the light ink is ejected. The dark ink is ejected by applying to a piezo element PZT the first drive pulse PS1, the third drive pulse PS3 and the fourth drive pulse PS4, which serve as waveform sections for a large dot. As a result thereof, approximately 21.0 pL of the dark ink is ejected.

As mentioned above, in the printer 1 of this embodiment, if drive pulses applied to a piezo element PZT are compared between a for-light-ink drive pulse (a waveform section) and a for-dark-ink drive pulse (a waveform section), the drive pulses are different for each of the dot formation data SI (the dot tone values). For example, for the dot formation data SI of a small dot that serves as the minimum dot tone value in ejection of ink, the second drive pulse PS2 is applied in the case of the light ink and the third drive pulse PS3 is applied in the case of the dark ink. Besides, for the dot formation data SI of a medium dot, the third drive pulse PS3 is applied in the case of the light ink and the first drive pulse and the third drive pulse PS3 are applied in the case of the dark ink. Also, for the dot formation data SI of a large dot, the first drive pulse and the third drive pulse PS3 are applied in the case of the light ink and the first drive pulse, the third drive pulse PS3, and the fourth drive pulse PS4 are applied in the case of the dark ink.

Since, for the dot formation data SI of a small dot and the dot formation data SI of a large dot, the drive pulses applied to a piezo element PZT are different between the light ink and the dark ink, it is possible to individually determine a light-ink ejected amount and a dark-ink ejected amount for each dot formation data SI. This enables to optimize a density range printed with the light ink and a density range printed with the dark ink, and enables to make the degree of density transition in a print image smoother. As a result thereof, graininess can be improved.

This point is considered in terms of the equivalent amount of the light cyan ink to the dark cyan ink. The light cyan ink in this embodiment is set to a density ⅓ times the dark cyan ink. Therefore, when an ink amount of the light ink converted to the dark ink (an equivalent amount) is obtained for each dot formation data SI, the ink amounts will be as shown in FIG. 13, for example. More specifically, an equivalent amount for the dot formation data SI of a small dot is approximately 0.8 pL. An equivalent amount for the dot formation data SI of a medium dot is approximately 2.3 pL, and an equivalent amount for the dot formation data SI of a large dot is approximately 4.7 pL. Here, an ink amount of the dark cyan ink for the dot formation data SI of a small dot is approximately 7.0 pL. That is to say, an equivalent amount to the dark ink of the light cyan ink that is ejected according to the dot formation data SI of a large dot is less than an amount of the dark cyan ink ejected according to the dot formation data SI of a small dot. As mentioned above, determining a light-cyan-ink ejected amount and a dark-cyan-ink ejected amount for each dot formation data SI enables to optimize a density range printed with dark cyan ink and a density range printed with light cyan ink.

Specifically, if amounts of the light cyan ink and amounts of the dark cyan ink that are ejected in formation of each type of dots are compared, using amounts of the dark cyan ink as references, the following relationship is established. That is, the relationship that a small dot of the light cyan ink (an equivalent amount: approximately 0.8 pL)<a medium dot of the light cyan ink (an equivalent amount: approximately 2.3 pL)<a large dot of the light cyan ink (an equivalent amount: approximately 4.7 pL)<a small dot of the dark cyan ink (approximately 7.0 pL)<a medium dot of the dark cyan ink (approximately 14.0 pL)<a large dot of the dark cyan ink (approximately 21.0 pL) is established. Since the ink amounts for each dot formation data SI that are compared using the ink amounts of the dark cyan ink as references are determined as mentioned above, the light cyan ink is mainly used in printing of a light-colored image, and the dark cyan ink is mainly used in printing of a dark-colored image. This enables to reduce the degree of use of the dark cyan ink in the light-colored image, and graininess can be improved.

Further, difference in ink amounts between contiguous dot-types among the above-mentioned types of dots is also considered. In this embodiment, a difference between a small dot with the light cyan ink (an equivalent amount: approximately 0.8 pL) and a medium dot with the light cyan ink (an equivalent amount: approximately 2.3 pL) is approximately 1.5 pL using the equivalent amounts as references. And, a difference between a medium dot with light cyan ink and a large dot with the light cyan ink (an equivalent amount: approximately 4.7 pL) is approximately 2.4 pL using the equivalent amounts as references, and a difference between a large dot with the light cyan ink and a small dot with the dark cyan ink (approximately 7.0 pL) is approximately 2.3 pL using the equivalent amounts as references. Further, a difference between a small dot with the dark cyan ink and a medium dot with the dark cyan ink (approximately 14.0 pL) is approximately 7.0 pL, and a difference between a medium dot with the dark cyan ink and a large dot with the dark cyan ink (approximately 21.0 pL) is approximately 7.0 pL.

As mentioned above, with respect to the difference in ink amounts between contiguous dot-types, an ink-amount difference between smaller-amount dots is smaller than an ink-amount difference between larger-amount dots, so that it is possible to make smoother the degree of density transition in a light-colored image whose graininess is likely to deteriorate, and graininess can improve. In addition thereto, with respect to these ink-amount differences, the ink-amount difference between dot-types becomes larger as an ink amount obtained in conversion to the dark ink becomes larger, so that it is possible to make the degree of density transition in a light-colored image smoother on this point, and graininess can improve.

The sections above describe a group of the light cyan ink and the dark cyan ink, and a group of the light magenta ink and the dark magenta ink is the same as mentioned above. Owing to the above-mentioned control of cyan and magenta, which greatly affect hues, the quality of print images can improve.

Further, when performing the control, the drive signals applied to a piezo element PZT in ejection of the light ink for a medium dot is the same as the drive signals applied to a piezo element PZT in ejection of the dark ink for a small dot. In addition, the drive signals applied to a piezo element PZT in ejection of the light ink for a large dot is the same as the drive signals applied to a piezo element PZT in ejection of the dark ink for a medium dot. As mentioned above, if for-dark-ink drive pulses (waveform sections) corresponding to a certain dot formation data SI (a dot tone value) is set to the same one as for-light-ink drive pulses corresponding to another dot formation data SI, it is possible to make the degree of density transition in a print image smoother while reducing the types of waveform sections included in the original drive signal.

Regarding Halftoning

Next, the halftoning is described. As mentioned above, among the halftoning, there are the first halftoning for cyan and magenta and the second halftoning for yellow and black.

Regarding First Halftoning

In the first halftoning, it is determined whether to form in one unit region any one of a small dot, a medium dot, and a large dot that are to be formed with the light ink (for convenience of explanation, each type of dots is referred to as a light small dot, a light medium dot, and a light large dot) and a small dot, a medium dot, and a large dot that are to be formed with the dark ink (for convenience of explanation, each type of dots is referred to as a dark small dot, a dark medium dot, and a dark large dot), or whether to form a plurality of dots overprinted in the unit region, or whether to form no dot or the like, and dot formation data SI is obtained.

Figure 14:
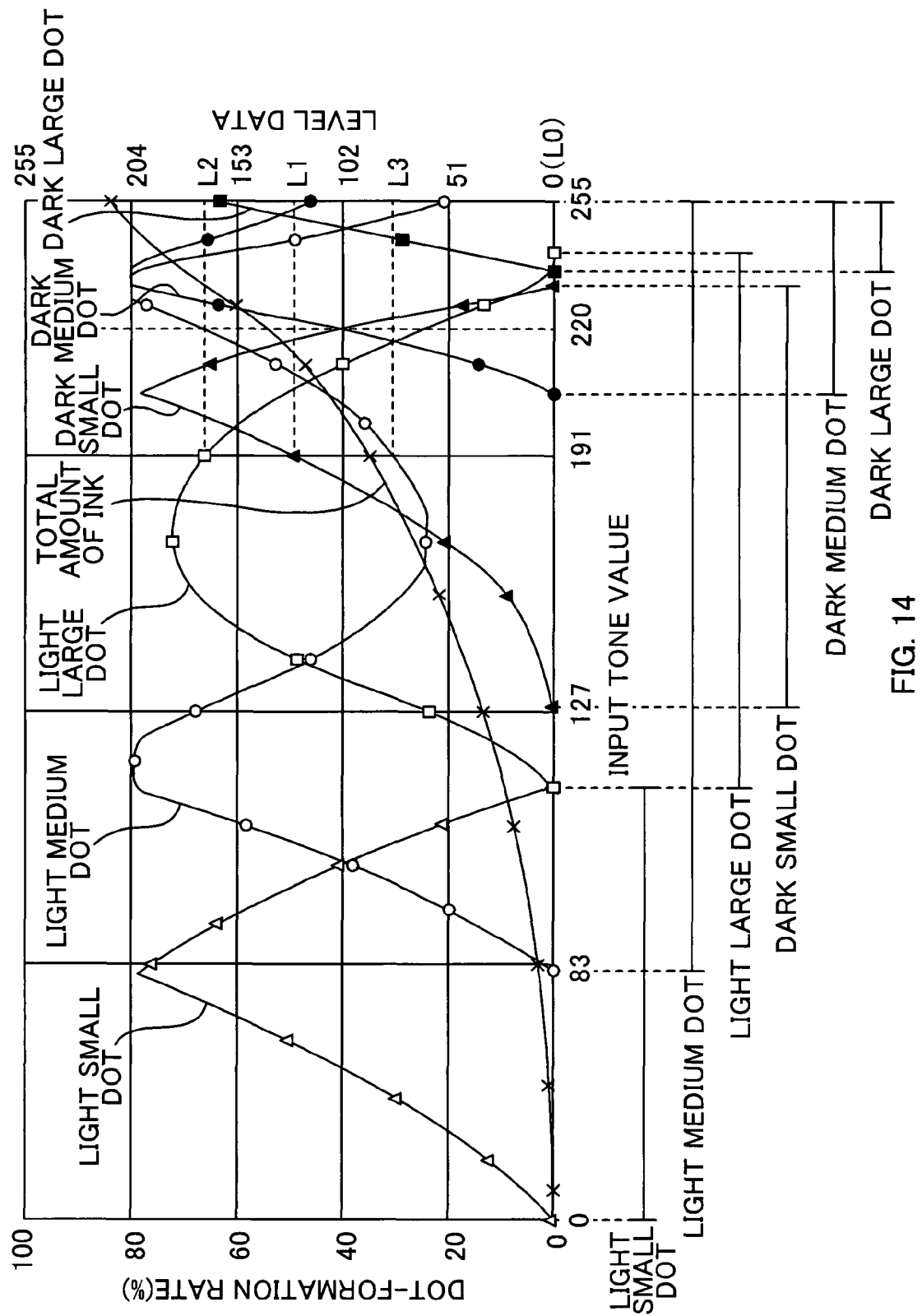
FIG. 14 is a graph showing a specific example of a first halftoning.

The first halftoning is described below based on a specific example. Here, FIG. 14 is a graph showing a specific example of the first halftoning. In this FIG. 14, a horizontal axis is input tone values (printing tone values). More specifically, it corresponds to to-be-converted CMYK pixel data having 256 tone levels. The left vertical axis indicates the dot-formation rate. This dot-formation rate indicates a rate at which each type of dots is formed in a targeted unit region. The dot-formation rate is indicated for each type of inks and each type of to-be-formed dots. The dot-formation rate of a light small dot is indicated by the line marked with white triangles, and the dot-formation rate of a light medium dot is indicated by the line marked with white circles. The dot-formation rate of a light large dot is indicated by the line marked with white rectangles, and the dot-formation rate of a dark small dot is indicated by the line marked with black triangles. Also, the dot-formation rate of a dark medium dot is indicated by the line marked with black circles, and the dot-formation rate of a dark large dot is indicated by the line marked with black rectangles. Note that the line marked with crosses indicates a total amount of ink in that unit region. Besides, the vertical axis on the right side indicates values of level data corresponding to the dot-formation rate. The level data is a value that is used when determining whether or not to form a dot in the targeted unit region.

In the first halftoning, when a tone value is inputted for a certain unit region, the host-side controller 111 determines whether to form or not to form a dot with the dark ink, in the order of a dark large dot, a dark medium dot, and a dark small dot. If formation of a dark large dot is decided, the dot formation data SI is set to data "11". In the same manner, if formation of a dark medium dot is decided, the dot formation data SI is set to data "10", and if formation of a dark small dot is decided, dot formation data SI is set to data "01". Note that, in any other case, it is considered that no dot will be formed and the dot formation data SI is set to data "00".

For example, if an input tone value (the horizontal axis) for a certain unit region is 191, the dot-formation rate of a dark large dot and the dot-formation rate of a dark medium dot are both 0%, and the dot-formation rate of a dark small dot is approximately 50%. In this case, level data L0 of a dark large dot is initially compared with a predetermined threshold specified by a dither matrix. At this stage, since level data L0 is equal to or lower than the predetermined threshold, it is determined that a dark large dot will not be formed. Next, level data L0 of a dark medium dot is also compared with a predetermined threshold. At this stage, since level data L0 is also equal to or lower than the predetermined threshold, it is determined that a dark medium dot will not be formed. Next, level data L1 of a dark small dot is compared with a predetermined threshold. If level data L1 is larger, it is determined that a dark small dot will be formed, or otherwise it is determined that a dark small dot will not be formed.

Also, the host-side controller 111 decides whether to form or not to form a dot with the light ink, in the order of a light large dot, a light medium dot, and a light small dot. Thus, the dot formation data SI is set. For example, if an input tone value for a certain unit region is 191, the dot-formation rate of a light large dot is a little less than 70%, and the dot-formation rate of a light medium dot is approximately 30%. Also, the dot-formation rate of a light small dot is 0%. In this case, level data L2 of a light large dot is initially compared with a predetermined threshold specified by a dither matrix. At this stage, if level data L2 is larger than the predetermined threshold, it is determined that a light large dot will be formed. And, if formation of a light large dot is determined, determinations for a light medium dot and for a light small dot are not performed. On the other hand, if non-formation of a light large dot is determined, determination for a light medium dot is performed. At this stage, level data L3 of a light medium dot is compared with a predetermined threshold. If level data L3 is larger than the predetermined threshold, it is determined that a light medium dot will be formed, or otherwise determination for a light small dot is performed. If shifting to determination for a light small dot, level data L0 is compared with a predetermined threshold, and non-formation of a light small dot is also determined because level data L0 is equal to or smaller than the predetermined threshold.

Since in this embodiment, light-ink amounts and dark-ink amounts that correspond to each type of dot formation data SI are determined as mentioned above, the light ink is mainly used in printing of a light-colored image, and the dark ink is mainly used in printing of a dark-colored image. For example, within a range from tone value 0 to tone value 127 which is almost intermediate, the light ink (a light small dot and a light medium dot) is used, and the dark ink is not used. Within a range from tone value 128 to tone value 191, a light medium dot, a light large dot, and a dark small dot are used. Further, within a range from tone value 192 to tone value 255, a light medium dot, a light large dot, a dark small dot, a dark medium dot, and a dark large dot are used. Within a range from tone value 128 to tone value 255, the dot-formation rates for each type of dots are determined such that a ratio of the dark ink becomes larger as a tone value becomes higher. Note that, in this embodiment, the light ink is used in printing of a dark-colored image having tone value 220 or higher. This is for the purpose of achieving a smooth tone representation. In other words, using the light ink as a supplement to the dark ink enables to moderate the degree of density transition, so that as light difference in density can be represented. Besides, since a density of the dark ink is supplemented by the light ink, the density of the dark ink can be set near a density of the light ink and a smooth tone representation can be achieved on this point.

Regarding Second Halftoning

In the second halftoning, whether to form any one of a small dot, a medium dot, and a large dot or whether to form no dot is decided for each one unit region, and the dot formation data SI is obtained. A basic concept of the second halftoning is the same as that of the first halftoning. Describing briefly, with respect to an input tone value of a certain unit region, level data of a large dot is obtained, and a value of this level data is compared to a predetermined threshold that is specified by a dither matrix. At this stage, if the value of the level data is larger, the formation of the large dot is decided, and data "11", which indicates formation of a large dot, is set. On the other hand, if non-formation of a large dot is decided, the same process is performed for a medium dot. At this stage, if formation of a medium dot is decided, data "10" indicating formation of a medium dot is set. Further, if non-formation of a medium dot is decided, the same process is performed for a small dot. At this stage, if formation of a small dot is decided, data "01" indicating formation of a small dot is set, and if non-formation of a small dot is decided, data "00" indicating non-formation of a dot is set.

When the data indicating formation or non-formation of A dot is set for all unit regions in these first and second halftonings, the halftoning is ended.

Overview of First Embodiment

In the printing system 100 of the first embodiment, a plurality of the types of the drive signals corresponding to the dot formation data SI (the dot tone values) are generated, and are applied to a piezo element PZT. With respect to a plurality of the types of the drive signals that are generated, the drive pulse that is for the dark ink and that corresponds to the dot formation data SI of a small dot (data "01", which corresponds to the minimum dot tone value in ejection of ink) is different from the drive pulse that is for the light ink and that corresponds to the same dot formation data SI. And also, the drive pulse that is for the dark ink and that corresponds to the dot formation data SI of a large dot (data "11", which corresponds to the maximum dot tone value) is different from the drive pulse that is for the light ink and that corresponds to the same dot formation data SI. Therefore, it is possible to determine individually the dark-ink ejected amount and the light-ink ejected amount that both correspond to the dot formation data SI of a small dot, and the dark-ink ejected amount and the light-ink ejected amount that both correspond to the dot formation data SI of a large dot. Accordingly, this enables to optimize the density range printed with the dark ink and the density range printed with the light ink, and enables to make the degree of density transition in a print image smoother. As a result thereof, graininess can be improved.

Besides, in this printing system 100, the control logics 83 (the switch-operation information storing section) are provided for each type of inks, and each of the control logics 83 stores switch-operation information that is for each dot formation data SI. The switch-operation information that is for each dot formation data SI and that has been outputted by each control logic 83 is selected by the decoder 84 based on the dot formation data SI, and the head switch 86 is operated based on the selected switch-operation information. In this configuration, controlling the operations of the head switch 86 enables to easily generate a plurality of the types of the drive signals from the common original drive signal COM. Besides, since the switch-operation information for each type of inks and for each type of the dot formation data SI is stored in the control logics 83, it is possible to perform controlling of multiple tone levels without calculations by the CPU 72, etc. As a result thereof, the printing operation can be performed at higher speed. This also facilitates support for using different types of inks because it is only necessary to rewrite contents stored in the control logics 83.

Second Embodiment

In the printing system 100 of the above-mentioned first embodiment, for a medium dot of the light ink and a small dot of the dark ink, the same drive pulse (the third drive pulse PS3) is used, and for a large dot of the light ink and a medium dot of the dark ink, the same drive pulses (the first drive pulse PS1 and the third drive pulse PS3) are used. With respect to this point, only for a large dot of the light ink and a small dot of the dark ink, a same drive pulse may be used. The printing system 100 of the second embodiment that is configured as mentioned above is described below.

Figure 15:
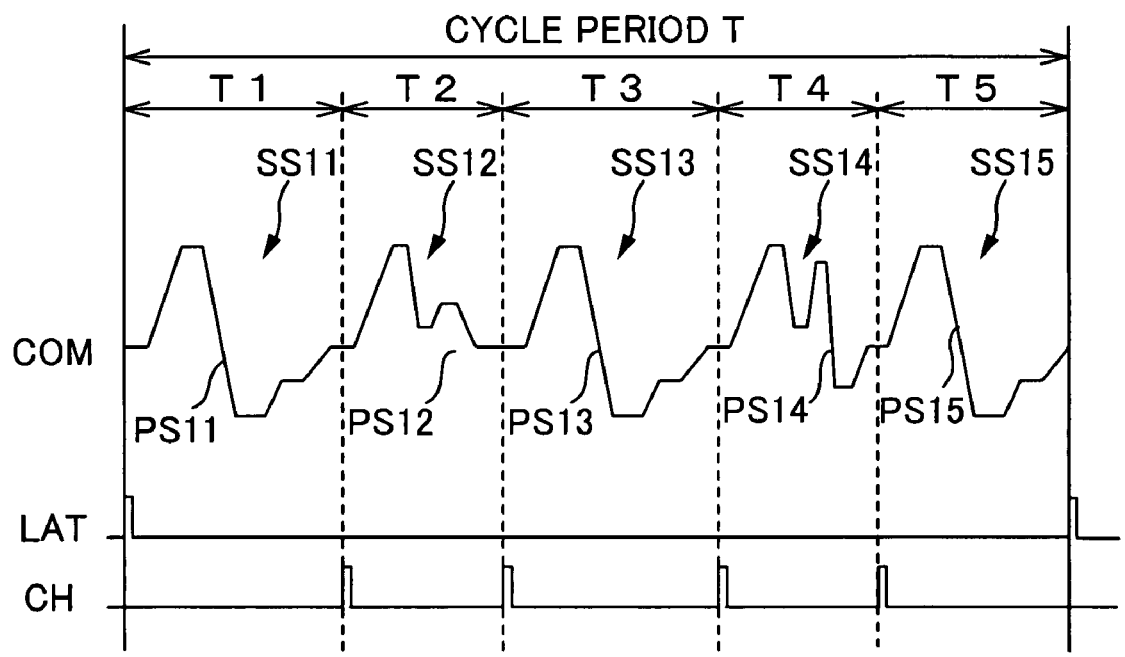
FIG. 15 is an explanatory diagram showing an original drive signal in a printing system of the second embodiment.

Here, FIG. 15 is an explanatory diagram showing the original drive signal COM in the printing system 100 in the second embodiment.

Figure 16A:
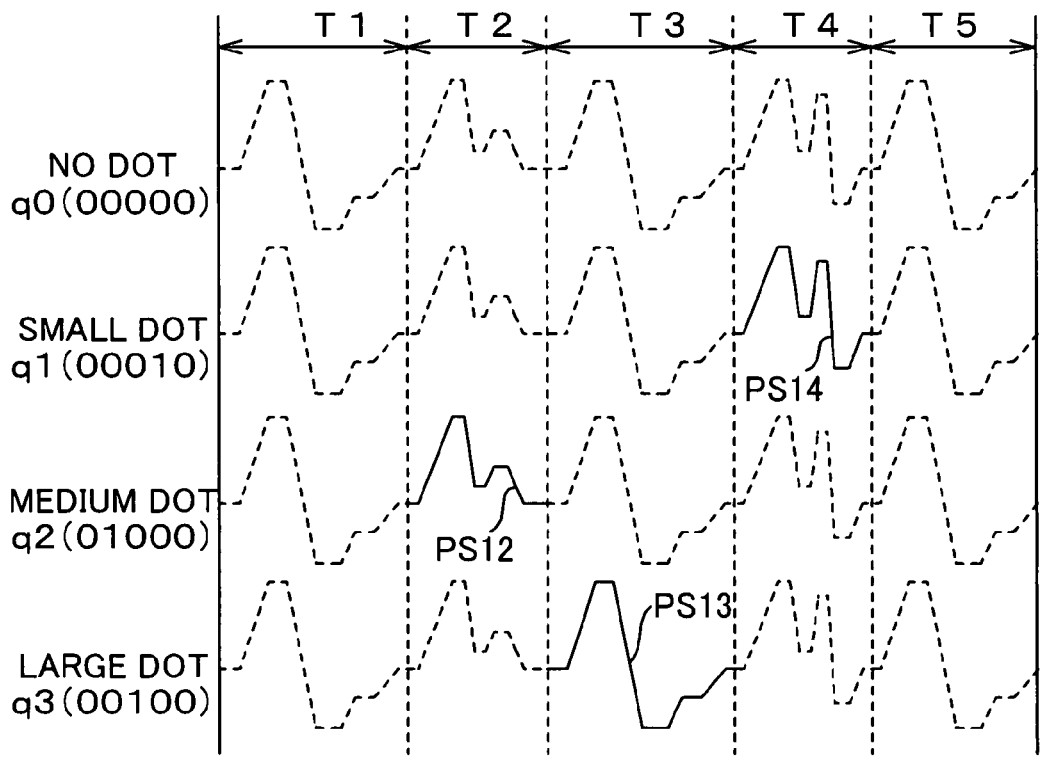
FIG. 16A is a diagram showing drive signals generated in ejection of the light cyan ink and the light magenta ink, for each tone level.

FIG. 16A is a diagram showing drive signals generated in ejection of the light cyan ink and the light magenta ink, for each tone level.

Figure 16B:
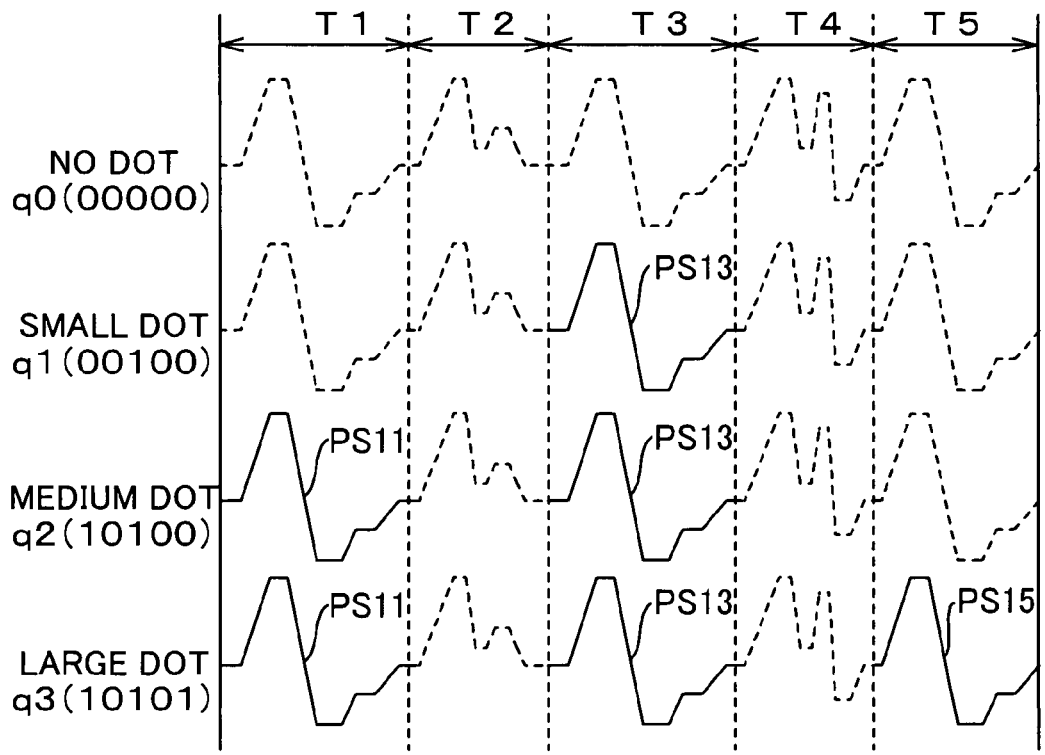
FIG. 16B is a diagram showing drive signals generated in ejection of the dark cyan ink, the dark magenta ink, the yellow ink, and the black ink, for each tone level.

FIG. 16B is a diagram showing drive signals generated in ejection of the dark cyan ink, the dark magenta ink, the yellow ink, and the black ink, for each tone level. FIG. 17 is a table showing drive pulses PS11 through PS15 applied to a piezo element PZT, for each type of inks and each tone level. FIG. 18 is a table showing, for each type of dot formation data SI, ejected ink amounts of the light cyan ink and the dark cyan ink and equivalent amounts of the light cyan ink to the dark cyan ink.

It should be noted that the hardware configuration in this second embodiment is the same as the above-mentioned first embodiment. Therefore, a description of hardware is omitted.

Regarding Original Drive Signal COM

First, the original drive signal COM is described. In the original drive signal COM, a first-period signal SS11 having a first drive pulse PS11 is generated in the period T1 in the cycle period T, and a second-period signal SS12 having a second drive pulse PS12 is generated in the period T2. Also, a third-period signal SS13 having a third drive pulse PS13 is generated in the period T3, and a fourth-period signal SS14 having a fourth drive pulse PS14 is generated in the period T4. Further, a fifth-period signal SS15 having a fifth drive pulse PS15 is generated in the period T5.

The drive pulses PS11, PS13, and PS15 have the same waveform. When any one of these drive pulses is applied to a piezo element PZT, approximately 7.0 pL of ink is ejected. When the second drive pulse PS12 is applied to a piezo element PZT, approximately 3.5 pL of ink is ejected, and when the fourth drive pulse PS14 is applied to a piezo element PZT, approximately 1.6 pL of ink is ejected.

Regarding Generation of Drive Signal

As shown in FIG. 16A, with respect to for-light-ink switch-operation information, the switch-operation information q0 is data "00000" and the switch-operation information q1 is data "00010". Besides, the switch-operation information q2 is data "01000", and the switch-operation information q3 is data "00100". Accordingly, as shown in FIG. 17, the switch-operation information q0 is selected for dot formation data SI of non-ejection, so that no drive signal is generated. For dot formation data SI of a small dot, the switch-operation information q2 is selected, the fourth-period signal SS14 becomes a drive signal, and applying the fourth drive pulse PS14 to a piezo element PZT causes ink to be ejected. As a result thereof, approximately 1.6 pL of ink is ejected from a nozzle Nz, so that a small dot having the size corresponding thereto is formed on a sheet of paper S. Besides, for dot formation data SI of a medium dot, the switch-operation information q2 is selected, the second-period signal SS12 becomes a drive signal, and applying the second drive pulse PS12 to a piezo element PZT causes ink to be ejected. As a result thereof, approximately 3.5 pL of ink is ejected from a nozzle Nz, so that a medium dot having the size corresponding thereto is formed on the paper sheet S. Also, for dot formation data SI of a large dot, the switch-operation information q3 is selected, the third-period signal SS13 becomes a drive signal, and applying the drive pulse PS13 to a piezo element PZT causes ink to be ejected. As a result thereof, approximately 7.0 pL of ink is ejected from a nozzle Nz, so that a large dot having the size corresponding thereto is formed on the paper sheet S.

On the other hand, as shown in FIG. 16B, with respect to for-dark-ink switch-operation information, the switch-operation information q0 is data "00000", and the switch-operation information q1 is data "00100". Besides, the switch-operation information q2 is data "10100", and switch-operation information q3 is data "10101". Accordingly, as shown in FIG. 17, a drive signal is not generated for dot formation data SI of non-ejection. For dot formation data SI of a small dot, the third-period signal SS13 becomes a drive signal, and approximately 7.0 pL of ink is ejected from a nozzle Nz according to the third drive pulse PS13. As a result thereof, a small dot having the size corresponding to this ink amount is formed on the paper sheet S. Besides, for dot formation data SI of a medium dot, the first-period signal SS11 and the third-period signal SS13 become drive signals, and approximately 14.0 pL of ink is ejected from a nozzle Nz according to the drive pulses PS11, PS13. As a result thereof, a medium dot having the size corresponding to this ink amount is formed on the paper sheet S. Also, for dot formation data SI of a large dot, the first-period signal SS11, the third-period signal SS13, and the fifth-period signal SS15 become drive signals, and approximately 21.0 pL of ink is ejected from a nozzle Nz according to the drive pulses PS11, PS13, PS15. As a result thereof, a large dot having the size corresponding to this ink amount is formed on the paper sheet S.

Here is a comparison of an ejecting operation based on the for-light-ink switch-operation information and an ejecting operation based on the for-dark-ink switch-operation information. For the dot formation data SI of a small dot, an ejection of the light ink is performed using the fourth drive pulse PS14. And, an ejection of the dark ink is performed using the third drive pulse PS13. For the dot formation data SI of a medium dot, the ejection of the light ink is performed using the second drive pulse PS12, and the ejection of the dark ink is performed using the first drive pulse PS11 and the third drive pulse PS13. For the dot formation data SI of a large dot, the ejection of the light ink is performed using the third drive pulse PS13. And, the ejection of the dark ink is performed using the first drive pulse PS11, the third drive pulse PS13, and the fifth drive pulse PS15.

As mentioned above, in the printer of this embodiment, with respect to the for-light-ink drive pulses (the waveform sections) and the for-dark-ink drive pulses (the waveform sections), the drive pulses applied to a piezo element PZT are different for each type of the dot formation data SI. Accordingly, it is possible to individually determine a light-ink ejected amount and a dark-ink ejected amount for each dot. This enables to optimize a density range printed with the light ink and a density range printed with the dark ink, and enables to make the degree of density transition in a print image smoother. As a result thereof, graininess can be improved.

Besides, in this embodiment, only the drive pulse used for a small dot of the dark ink (the waveform section of the minimum dot tone value in ejection of ink) and the drive pulse used for a large dot of the light ink (the waveform section of the maximum dot tone value) are the third drive pulse PS13, which is common. This enables to further make the degree of density transition in a print image smoother while reducing the types of the drive pulses included in the original drive signal.

This point is considered in terms of equivalent amounts of the light cyan ink to the dark cyan ink. In this embodiment, when an ink amount of the light ink converted to the dark ink (an equivalent amount) is obtained for each type of dots, the amount will be as shown in FIG. 18, for example. More specifically, an equivalent amount for a small dot is approximately 0.5 pL. An equivalent amount for a medium dot is approximately 1.2 pL, and an equivalent amount for a large dot is approximately 2.3 pL. Since an ink amount of the dark cyan ink for a small dot is approximately 7.0 pL, the equivalent amount to dark ink of the light cyan ink ejected in formation of a large dot is less than the amount of the dark cyan ink ejected in formation of a small dot. Accordingly, in this embodiment, it is possible to optimize the density range printed with the dark cyan ink and the density range printed with the light cyan ink.

Further, difference in ink amounts between contiguous dot-types is also considered. In this embodiment, a difference in ink amounts between a small dot of the light cyan ink (an equivalent amount: approximately 0.5 pL) and a medium dot of the light cyan ink (an equivalent amount: approximately 1.2 pL) is approximately 0.7 pL using the equivalent amounts as references. And, a difference in ink amounts between a medium dot of the light cyan ink and a large dot of the light cyan ink (an equivalent amount: approximately 2.3 pL) is approximately 1.1 pL using the equivalent amounts as references, and a difference between a large dot of the light cyan ink and a small dot of the dark cyan ink (approximately 7.0 pL) is approximately 4.7 pL using the equivalent amounts as references. Note that an ink-amount difference between a small dot of the dark cyan ink and a medium dot of the dark cyan ink, and an ink-amount difference between a medium dot of the dark cyan ink and a large dot of the dark cyan ink are both approximately 7.0 pL. In this embodiment, with respect to these differences in ink amounts between contiguous dot-types, the ink-amount difference between smaller-amount dots is smaller than the ink-amount difference between larger-amount dots, so that it is possible to make smoother the degree of density transition in a light-colored image whose graininess is likely to deteriorate, and to improve graininess. Further, with respect to this ink amount difference, difference in ink amounts between dots becomes larger as an ink amount obtained in conversion to the dark ink becomes larger, so that it is possible to make the degree of density transition in a light-colored image smoother on this point and to improve graininess.

Overview of Second Embodiment

In the printing system 100 of the second embodiment, a plurality of the types of the drive signals corresponding to the dot formation data SI are generated and are applied to a piezo element PZT. With respect to a plurality of the types of the drive signals that are generated, the drive pulse that is for the dark ink and that corresponds to the dot formation data SI of a small dot is different from and the drive pulse that is for the light ink and that corresponds to the same dot formation data SI. And also, the drive pulse that is for the dark ink and that corresponds to the dot formation data SI of a large dot is different from the drive pulse that is for the light ink and that corresponds to the same dot formation data SI. Therefore, it is possible to determine individually the dark-ink ejected amount and the light-ink ejected amount that both correspond to the dot formation data SI of a small dot, and the dark-ink ejected amount and the light-ink ejected amount that both correspond to the dot formation data SI of a large dot. Accordingly, this enables to optimize the density range printed with the dark ink and the density range printed with the light ink, and enables to make the degree of density transition in a print image smoother. As a result thereof, graininess can be improved.

Especially, in this printing system 100, only a drive pulse used for a small dot of the dark ink and a drive pulse used for a large dot of the light ink are the third drive pulse PS13, which is common. Accordingly, it is possible to further make the degree of density transition in a print image smoother while reducing the types of the drive pulses included in the original drive signal.

Regarding Other Embodiments

Though the above-mentioned embodiments describe mainly the printer 1, the embodiments also include disclosure of a printing apparatus, a printing method, a printing system, a program and the like. Though the printer 1 as an embodiment is described above, the above-mentioned embodiments are provided for facilitating the understanding of the invention and are not to be interpreted as limiting the invention. As a matter of course, the invention can be altered and improved without departing from the gist thereof and the invention includes equivalents thereof. Especially, embodiments described below are also included in the invention.

Regarding Tone Value

The above-mentioned embodiments describes the printing system 100 in which the number of the types of the dot formation data SI (the number of the tone values) is "four". However, the invention is not limited to the above-mentioned configuration. That is, it is necessary only that a plurality of the tone values exist. For example, the number of the tone values may be "three", and a same configuration is possible even if the number is "six" or "eight".

Regarding Drive Signal

In the above-mentioned embodiments, the different drive signals are generated using the common original drive signal COM by making the selection patterns of the drive pulses (waveform sections) different. On this point, a plurality of types of the original drive signals COM may be generated by providing a plurality of the original-drive-signal generating circuits 50.

Regarding Color of Ink

The above-mentioned embodiments describe an example of the printing system 100 that uses the dark cyan ink and the light cyan ink in printing of multi-level darkness/lightness of cyan and that uses the dark magenta ink and the light magenta ink in printing of multi-level darkness/lightness of magenta. However, the dark ink and the light ink used in printing of multi-level darkness/lightness are not limited to cyan and magenta, and other colors may also be used. For example, in multi-tone-level printing of black, the black ink and a gray ink may be used. Also, in multi-tone-level printing of sepia, a dark sepia ink and a light sepia ink may be used.

Regarding Printer 1

The above-mentioned embodiments describe an example of the printer 1 that performs printing while moving in the carriage movement direction the carriage CR having the head 41 (the head unit 40) attached thereto. However, the invention is not limited to the printer having this configuration. For example, a printer including a line scan head whose head 41 (nozzles Nz) is arranged in a direction intersecting a transportation direction of a sheet of paper S (more preferably a direction perpendicular to the paper sheet S) can also be achieved.

Further, the above-mentioned embodiments are explained by illustrating the printer 1 which has a single function and performs printing only. However, a printing apparatus in the invention is not limited to such a printer 1. For example, an apparatus may be a so-called printer/scanner multifunction machine which has functions of the printer 1 and functions of a scanner. Further, a plotter or a facsimile may also be used as mentioned above. In addition, the same technology as mentioned in these embodiments may apply to a variety of printing apparatuses utilizing inkjet technology: color filter manufacturing equipment, dyeing equipment, micromachining equipment, semiconductor manufacturing equipment, surface treatment equipment, a three-dimensional molding machine, a vaporizer, organic EL manufacturing equipment (especially, polymer EL manufacturing equipment), display manufacturing equipment, film formation equipment, and DNA chip manufacturing equipment. Also, methods used therein and manufacturing methods thereof are also included in applications.

Regarding Elements Contained in Head 41

In each of the above-mentioned embodiments, the piezo element PZT is exemplified as an element contained in the head 41, that is, an element performing the operation for ejecting ink. However, the invention is not limited to the piezo element PZT. For example, an electrostatic actuator, a magnetostrictive element, or a heating element can also be an element contained in the head 41.

What is claimed is:

1. A printing method, comprising:
generating a plurality of types of drive signals, where a waveform section that is for a dark ink of a certain color and that corresponds to a minimum dot tone value in ejection of ink is different from a waveform section that is for a light ink of the certain color and that corresponds to the minimum dot tone value, and where a waveform section that is for the dark ink of the certain color and that corresponds to a maximum dot tone value is different from a waveform section that is for the light ink of the certain color and that corresponds to the maximum dot tone value; and
ejecting the dark ink and the light ink from a head by applying a drive signal that is generated based on a dot tone value designated according to a size of a to-be-formed dot and based on a type of the inks, to an element that is provided on the head and that performs an operation for ejecting the inks, an amount of each ink being determined for each dot tone value,
wherein in generating the plurality of the types of the drive signals,
the drive signals including a drive signal whose waveform section that is for-light-ink and that corresponds to the maximum dot tone value is determined and a drive signal whose waveform section that is for the dark ink and that corresponds to the minimum dot tone value is determined,
wherein an amount converted to the dark ink of a light ink that is ejected according to the maximum dot tone value is smaller than an amount of a dark ink that is ejected according to the minimum dot tone value.

2. A printing method according to claim 1, wherein:
in generating a plurality of the types of the drive signals,
an original drive signal that has a plurality of the waveform sections is generated, and
an operation of a switch that applies to the element and interrupts the original drive signal is controlled according to the dot tone value designated according to the size of the to-be-formed dot and the type of the ink.

3. A printing method according to claim 2, wherein:
in generating a plurality of the types of the drive signals,
switch-operation information that is stored in a switch-operation information storing section for each type of the dot tone values and that is for determining the operation of the switch depending on a type of a to-be-ejected ink is selected base on the designated dot tone value, and
the operation of the switch is controlled by using the selected switch-operation information.

4. A printing method according to claim 1, wherein:
in generating a plurality of the types of the drive signals,
a plurality of the types of the drive signals are generated, where a waveform section that is for the dark ink and that corresponds to a certain dot tone value is the same as a waveform section that is for the light ink and that corresponds to another dot tone value.

5. A printing method according to claim 4, wherein:
in generating a plurality of the types of the drive signals,
a plurality of types of the drive signals are generated, where a waveform section that is for the dark ink and that corresponds to the minimum dot tone value is the same as a waveform section that is for the light ink and that corresponds to the maximum dot tone value.

6. A printing method according to claim 1, wherein:
in ejection of the dark ink and the light ink from the head, a dark ink and a light ink that are used in printing of multi-level darkness/lightness of cyan are ejected, the amount of each ink varying for each of the dot tone values.

7. A printing method according to claim 1, wherein:
in ejection of the dark ink and the light ink from the head, a dark ink and a light ink that are used in printing of multi-level darkness/lightness of magenta are ejected, the amount of each ink varying for each of the dot tone values.

8. A printing method according to claim 1, wherein:
in generating a plurality of the types of the drive signals, a type of an ink ejected by the head is recognized based on ink-type information that is stored in a container-side storage section provided in an ink storage container that stores a plurality of the types of the ink, and that indicates a type of the ink stored in the ink storage container.

9. A printing apparatus, comprising:
a head that includes an element that operates for ejecting an ink, and that ejects a dark ink and a light ink that are used in printing of multi-level darkness/lightness of a certain color, an amount of the ink being determined for each dot tone value that is based on a size of a to-be-formed dot; and a drive-signal generating section
that generates a drive signal whose waveform section is for operating the element, and
that generates a plurality of types of the drive signals, where a waveform section that is for the dark ink and that corresponds to a minimum dot tone value in ejection of ink is different from a waveform section that is for the light ink and that corresponds to the minimum dot tone value, and where a waveform section that is for the dark ink and that corresponds to a maximum dot tone value is different from a waveform section that is for the light ink and that corresponds to the maximum dot tone value,
wherein in generating the plurality of the types of the drive signals,
the drive signals including a drive signal whose waveform section that is for-light-ink and that corresponds to the maximum dot tone value is determined and a drive signal whose waveform section that is for the dark ink and that corresponds to the minimum dot tone value is determined,
wherein an amount converted to the dark ink of a light ink that is ejected according to the maximum dot tone value is smaller than an amount of a dark ink that is ejected according to the minimum dot tone value.

* * * * *